United States Patent
Cho et al.

(10) Patent No.: US 10,313,829 B2
(45) Date of Patent: Jun. 4, 2019

(54) METHOD AND APPARATUS FOR MANAGING POINT OF INTEREST BASED ON TILE

(71) Applicant: Samsung Electronics Co., Ltd., Gyeonggi-do (KR)

(72) Inventors: Sung Rae Cho, Gyeonggi-do (KR); Hyun Myung Kim, Gyeonggi-do (KR); Youngpo Lee, Seoul (KR); Chai-Man Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/793,476

(22) Filed: Oct. 25, 2017

(65) Prior Publication Data

US 2018/0115867 A1    Apr. 26, 2018

(30) Foreign Application Priority Data

Oct. 25, 2016  (KR) .................. 10-2016-0139428

(51) Int. Cl.
| | |
|---|---|
| *H04W 4/20* | (2018.01) |
| *H04W 4/021* | (2018.01) |
| *H04W 64/00* | (2009.01) |
| *H04W 4/50* | (2018.01) |

(52) U.S. Cl.
CPC ............. *H04W 4/021* (2013.01); *H04W 4/20* (2013.01); *H04W 4/50* (2018.02); *H04W 64/006* (2013.01)

(58) Field of Classification Search
CPC ......... H04W 4/021; H04W 4/50; H04W 4/20; H04W 64/006
See application file for complete search history.

(56) References Cited

U.S. PATENT DOCUMENTS

| | | | |
|---|---|---|---|
| 8,504,061 B2 | 8/2013 | Grainger et al. | |
| 9,019,984 B2 | 4/2015 | Grosman et al. | |
| 9,351,114 B2 | 5/2016 | Chatterjee et al. | |
| 2010/0094550 A1* | 4/2010 | Tsurutome | G01C 21/3415 701/533 |
| 2014/0365489 A1* | 12/2014 | Cline | H04W 4/70 707/736 |

* cited by examiner

*Primary Examiner* — Chuong A Ngo
(74) *Attorney, Agent, or Firm* — The Farrell Law Firm, P.C.

(57) ABSTRACT

Disclosed are a method and an apparatus for managing a Point of Interest (POI) using a tile. An electronic device includes a memory; and a processor, wherein the processor is configured to receive map information of a cellular base station including a plurality of tiles from at least one server, determine a location of the electronic device based on the received map information, identify at least one tile corresponding to the location of the electronic device based on a request of the processor for configuring a POI, and obtain a first search list of POIs included in the at least one identified tile.

19 Claims, 14 Drawing Sheets

METHOD AND APPARATUS FOR MANAGING POINT OF INTEREST BASED ON TILE

PRIORITY

This application claims priority under 35 U.S.C. § 119(a) to Korean Patent Application Serial No. 10-2016-0139428, which was filed in the Korean Intellectual Property Office on Oct. 25, 2016, the entire content of which is incorporated herein by reference.

BACKGROUND

1. Field of the Disclosure

The present disclosure relates a method and an apparatus for managing a Point of Interest (POI) through geo-fencing.

2. Description of Related Art

As the use of portable electronic devices such as smart phones, tablet PCs, and wearable devices increase, various services using location information for portable electronic devices have emerged. For example, there may be a service by which a location information provider transmits a notification or an advertisement related to a particular region to an electronic device when the user moves the electronic device within a geofence corresponding to a virtual boundary surrounding the particular region. As described above, the location information provider may provide various services by geofencing when the user with an electronic device enters a partitioned region, exits the partitioned region, or stays in the partitioned region.

In general, information on a real-time movement path of the electronic device or a current location of the electronic device is used by various location information services as well as geofencing. Meanwhile, in order to allow the location information provider to determine the location of the electronic device in real time, an always-on function of the electronic device is necessary. However, since the electronic device has a limited battery capacity, the use of the always-on function must be restricted. Also, a global positioning system (GPS) of the electronic device used for acquiring the location information of the electronic device consumes a considerable amount of power.

SUMMARY

According to an aspect of the present disclosure, through a method of reducing power consumption of the electronic device using a geofencing service, it may be determined whether the electronic device enters a POI (e.g., in/out bound) through a short-range communication network, or a cellular network therefore consuming less power than when using GPS.

In accordance with an aspect of the present disclosure, an electronic device is provided that includes a memory; and a processor configured to receive map information of a cellular base station including a plurality of tiles from at least one server, determines a location of the electronic device based on the received map information, identifies at least one tile corresponding to the location of the electronic device based on a request from the processor for configuring a POI, and obtains a first search list of POIs included in the at least one identified tile.

In accordance with an aspect of the present disclosure, a method of managing a POI based on a location of an electronic device includes receiving map information of a cellular base station including a plurality of tiles from at least one server; determining a location of the electronic device based on the received map information; identifying at least one tile corresponding to the location of the electronic device based on a request from a processor of the electronic device for configuring a POI; and obtaining a first search list of POIs included in the at least one identified tile.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
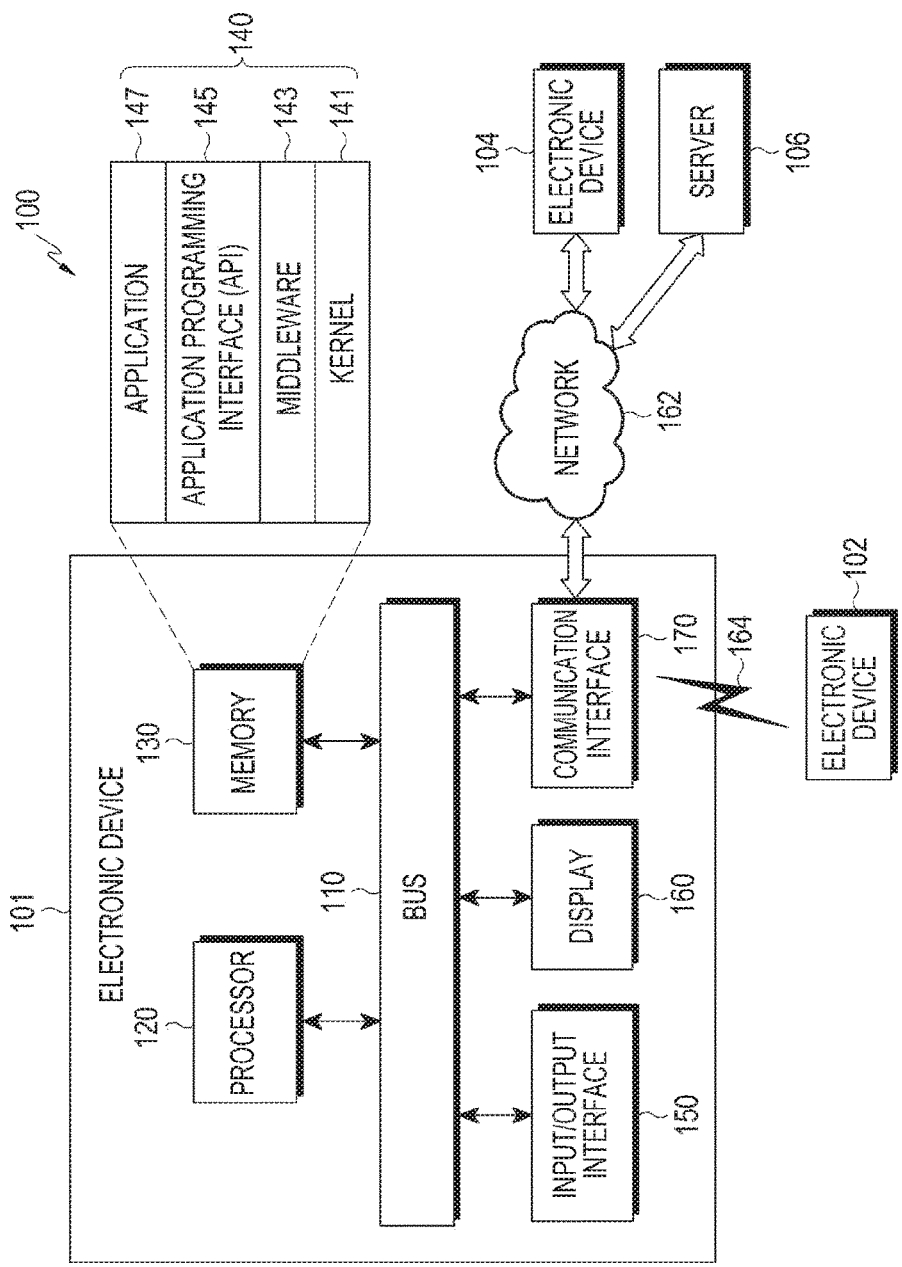
FIG. 1 illustrates a network environment including an electronic device according to various embodiments of the present disclosure.

The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected", or "directly coupled" to another element (e.g., second element), the element may be connected directly to the another element or connected to the another element through yet another element (e.g., third element). The term "and/or" covers a combination of a plurality of items, or any of the plurality of items.

The expression "configured to" as used in various embodiments of the present disclosure may be interchangeably used with "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In embodiments of the present disclosure, the electronic device may include at least one of medical devices (e.g., portable medical measuring devices (a blood glucose level monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a GPS receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM), point of sales (POS) device, or Internet of things (IoT) device (e.g., a light bulb, sensors, electric or gas meter, a sprinkler device, a fire alarm, a thermostat, a streetlamp, a toaster, a sporting goods, a hot water tank, a heater, a boiler, and the like).

An electronic device may include at least one of a part of furniture or a building and/or structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned devices. The electronic device is not limited to the above described devices. In the present disclosure, the term "user" may indicate a person using an electronic device, or a device (e.g., an artificial intelligence electronic device) using an electronic device.

An electronic device 101 within a network environment 100 according to various embodiments of the present disclosure will be described with reference to FIG. 1 The electronic device 101 may include a bus 110, a processor 120, a memory 130, an input/output interface 150, a display 160, and a communication circuit 170. The electronic device 101 may omit at least one of the elements, or may further include other elements. The bus 110 may include a circuit that interconnects the elements 110 to 170, and transmits communication (e.g., control messages or data) between the elements. The processor 120 may include one or more of a central processing unit, an application processor, and a communication processor (CP). The processor 120 may carry out operations or data processing relating to the control and/or communication of at least one other element of the electronic device 101.

The memory 130 may include a volatile and/or non-volatile memory. The memory 130 may store instructions or data relevant to at least one other element of the electronic device 101. According to an embodiment of the present disclosure, the memory 130 may store software and/or a program 140. The program 140 may include a kernel 141, middleware 143, an application programming interface (API) 145, and/or application programs (or applications) 147. At least some of the kernel 141, the middleware 143, and the API 145 may be referred to as an operating system. The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (e.g., the bus 110, the processor 120, the memory 130, or the like) of the electronic device 101 to one or more of the application programs 147, and may process the one or more task requests. The API 145 is an interface used by the application programs 147 to control a function provided from the kernel 141 or the middleware 143, and may include at least one interface or function (e.g., an instruction) for a file control, a window control, image processing, a character control, or the like. For example, the input/output interface 150 may forward instructions or data, which is input from a user or an external device, to a plurality of other elements of the electronic device 101, or may output instructions or data, which is received from the plurality of other elements of the electronic device 101, to the user or the external device.

The display 160 may include a liquid crystal display (LCD), a light emitting diode (LED) display, an organic light emitting diode (OLED) display, a micro electro mechanical system (MEMS) display, or an electronic paper display. The display 160 may display various types of content (e.g., text, images, videos, icons, and/or symbols) for a user. The display 160 may include a touch screen and may receive a touch, gesture, proximity, or hovering input using an electronic pen or the user's body part.

The communication interface 170 may configure communication between the electronic device 101 and an external device (e.g., a first external electronic device 102, a second external electronic device 104, or a server 106). For example, the communication interface 170 may be connected to a network 162 through wireless or wired communication to communicate with the second external electronic device 104, or the server 106.

The wireless communication may include a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, the wireless communication may include at least one of Wi-Fi, Bluetooth™, Bluetooth low energy (BLE), ZigBee, near field communication (NFC), magnetic secure transmission (MST), Radio Frequency (RF), and body area network (BAN). The wired communication may include GNSS. The GNSS may be a GPS, a global navigation satellite system (Glonass), a Beidou navigation satellite system (Beidou), or Galileo which is the European global satellite-based navigation system. Hereinafter, in this document, the term "GPS" may be interchangeable with the term "GNSS". The wired communication may include at least one of a universal serial bus (USB), a high definition multimedia interface (HDMI), recommended standard 232 (RS-232), a plain old telephone service (POTS), and the like. The network 162 may include a telecommunications network, for example, at least one of a computer network (e.g., a LAN, or a WAN), the Internet, and a telephone network.

Each of the first and second external electronic devices 102 and 104 may be of the same or a different type from the electronic device 101. According to various embodiments of the present disclosure, all or some of the operations executed in the electronic device 101 may be executed in another electronic device or a plurality of electronic devices. When the electronic device 101 has to perform some functions or services automatically or in response to a request, the electronic device 101 may make a request for performing at least some functions relating thereto to another electronic device 102 or 104, or the server 106 instead of performing the functions or services by itself. Another electronic device may execute the requested functions or the additional functions, and may deliver a result of the execution to the electronic device 101. The electronic device 101 may provide the received result as it is, or may perform additional processing on the received result to provide the requested functions or services. To this end cloud computing, distributed computing, or client-server computing technology may be used.

According to various embodiments of the present disclosure, through a method of reducing power consumption of the electronic device using a geofencing service, it may be determined whether the electronic device enters a POI (e.g., in/out bound) through a short-range communication network or a cellular network that consumes less power than the GPS. More specifically, in using the short-range communication network or the cellular network, a real-time location of the electronic device may be determined using a CP that periodically operates without any assistance of an AP. Since the AP of the electronic device can maintain a sleep mode while the CP determines the real-time location of the electronic device, it may reduce power consumption of the electronic device.

When the electronic device enters a predetermined POI and dwells in the POI for a predetermined time, the CP of the electronic device having the AP that usually maintains the sleep mode to reduce power consumption may wake up the AP from the sleep mode and make the AP perform an operation after the user enters the POI. The CP of the electronic device may monitor whether the electronic device enters the predetermined POI periodically or in real time.

The operation of determining whether the electronic device enters the predetermined POI by the CP of the electronic device is performed for all of the predetermined points of interest therefore the search time may increase according to the number of predetermined points of interest. Further, the operation of determining whether the electronic device enters the predetermined POI may be repeatedly performed whenever the electronic device moves to a predetermined location therefore an unnecessary operation may be performed by repeatedly searching for a POI that is not required to be monitored in real time since the POI is spaced apart from the current location of the electronic device.

Various embodiments of the present disclosure may provide a method and an apparatus of dividing points of interest based on tiles of an exclusive region and then monitoring only a POI, which can be accessed in the future, to determine the current location of the electronic device.

An electronic device according to various embodiments of the present disclosure may include the memory 130 and the processor 120, wherein the processor may receive map information from a cellular base station including a plurality of tiles from at least one server 106, determine a location of the electronic device based on the received map information, identify at least one tile corresponding to the location of the electronic device based on a request of the processor for configuring a POI, and obtain a first search list for POIs included in the at least one identified tile.

In the electronic device according to various embodiments of the present disclosure, when the determined location is changed, the processor may determine whether the changed location is within a threshold area based on the determined location, when the changed location is within the threshold area, measure a dwelling time of the electronic device within the threshold area, and when the measured dwelling time is longer than or equal to a threshold time, obtain a second search list including at least one POI among the POIs included in the acquired first search list.

In the electronic device according to various embodiments of the present disclosure, the processor may obtain the second search list including a POI existing within a preset area based on the determined location among the POIs included in the first search list.

In the electronic device according to various embodiments of the present disclosure, when the determined location is changed, the processor may determine whether the changed location is within a threshold area based on the determined location, when the changed location is not within the threshold area, re-receive map information from a cellular base station including a plurality of tiles from the at least one server, determine the changed location of the electronic device based on the re-received map information, identify at least one tile corresponding to the changed location of the electronic device based on a request of the processor for configuring a POI, and obtain a changed search list for POIs included in the at least one identified tile corresponding to the changed location of the electronic device.

In the electronic device according to various embodiments of the present disclosure, the processor may further identify at least one tile adjacent to the at least one identified tile and obtain the first search list to which a POI included in the at least one tile adjacent to the at least one identified tile is added.

In the electronic device according to various embodiments of the present disclosure, the processor may identify a region including the determined location among a plurality of regions of the at least one identified tile, the region is partitioned by at least one straight line passing through a central point of the at least one identified tile, and identify at least one tile adjacent to the at least one identified tile based on the identified region.

In the electronic device according to various embodiments of the present disclosure, the processor may obtain a cell density of the at least one identified tile based on a number of cellular base stations included in the at least one identified tile, when the obtained cell density is smaller than a threshold value, determine the location of the electronic device based on the determined location and at least one of the information received from at least one wireless local area network (WLAN) base station and GPS information, and when the obtained cell density is greater than or equal to the threshold value, determine the location of the electronic device based on the information received from at least one cellular base station included in the at least one identified tile.

In the electronic device according to various embodiments of the present disclosure, the processor may further identify at least one tile adjacent to the at least one identified tile, obtain a cell density of the at least one tile adjacent to the at least one identified tile based on a number of cellular base stations included in the at least one tile adjacent to the at least one identified tile, when the obtained cell density is smaller than a threshold value, determine the location of the electronic device based on the determined location and at least one of the information received from at least one WLAN base station and GPS information, and when the obtained cell density is greater than or equal to the threshold value, determine the location of the electronic device based on the information received from at least one cellular base station included in the at least one tile adjacent to the at least one identified tile.

In the electronic device according to various embodiments of the present disclosure, the plurality of tiles may correspond to a plurality of quadrangles arranged in a lattice form.

Figure 2:
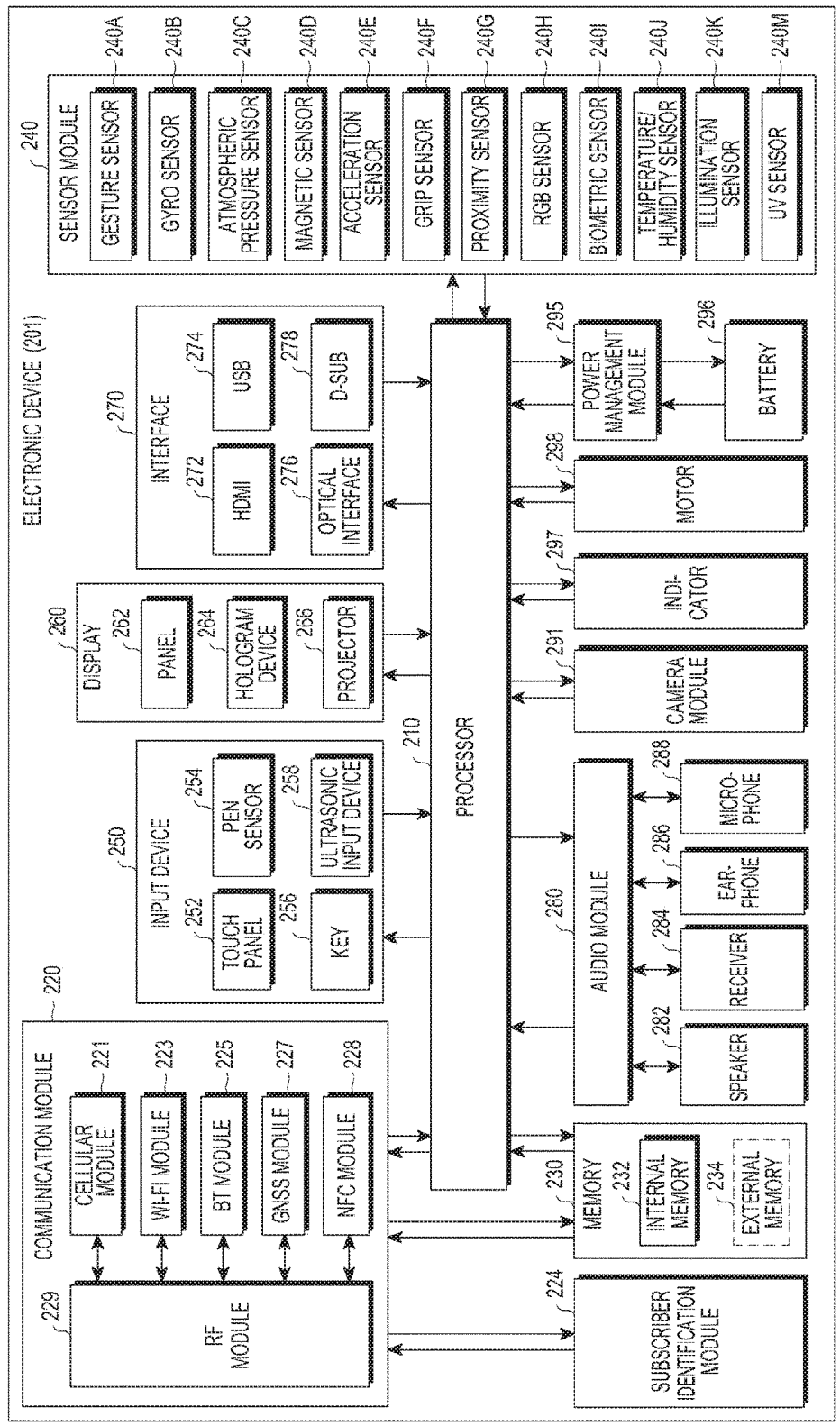
FIG. 2 is a block diagram of an electronic device according to various embodiments of the present disclosure.

FIG. 2 is a block diagram of an electronic device 201 according to various embodiments of the present disclosure. The electronic device 201 may include the whole or part of the electronic device 101 illustrated in FIG. 1. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto, and may perform various data processing and operations by driving an operating system or an application program. The processor 210 may be implemented by, a system on chip (SoC). The processor 210 may further include a graphic processing unit (GPU) and/or an image signal processor (ISP). The processor 210 may also include at least some (e.g., a cellular module 221) of the elements illustrated in FIG. 2. The processor 210 may load, in a volatile memory, instructions or data received from at least one of the other elements (e.g., a non-volatile memory), process the loaded instructions or data, and store the result data in the non-volatile memory.

The communication module 220 may have a configuration that is the same as or similar to the communication interface 170. The communication module 220 (e.g., the communication interface 170) may include a cellular module 221, a Wi-Fi module 223, a Bluetooth (BT) module 225, a GNSS module 227, an NFC module 228, and an RF module 229. The cellular module 221 may provide, a voice call, a video call, a text message service, an Internet service, or the like through a communication network. According to an embodiment of the present disclosure, the cellular module 221 may identify and authenticate the electronic device 201 within a communication network using the SIM 224 (e.g., a SIM card). The cellular module 221 may perform at least some of the functions that the processor 210 may provide. The cellular module 221 may include a CP. At least some (e.g., two or more) of the cellular module 221, the Wi-Fi module 223, the BT module 225, the GNSS module 227, and the NFC module 228 may be included in one integrated circuit (IC) or IC package. The RF module 229 may transmit and/or receive a communication signal (e.g., an RF signal). The RF module 229 may include a transceiver, a power amp module (PAM), a frequency filter, a low noise amplifier (LNA), an antenna, or the like. At least one of the cellular module 221, the Wi-Fi module 223, the BT module 225, the GNSS module 227, and the NFC module 228 may transmit and/or receive an RF signal through a separate RF module. The SIM 224 may include a card that includes a SIM, or an embedded SIM, and may contain unique identification information (e.g., an integrated circuit card identifier (ICCID)) or subscriber information (e.g., international mobile subscriber identity (IMSI)).

The memory 230 may include an internal memory 232, or an external memory 234. The internal memory 232 may include at least one of a volatile memory (e.g., a DRAM, an SRAM, an SDRAM, or the like) and a non-volatile memory (e.g., a one time programmable ROM (OTPROM), a PROM, an EPROM, an EEPROM, a mask ROM, a flash ROM, a flash memory, a hard disc drive, or a solid state drive (SSD)). The external memory 234 may include a flash drive a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201.

The sensor module 240 may measure a physical quantity or detect the operating state of the electronic device 201, and may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor configured to control the sensor module 240 as a part of or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include a recognition sheet that is a part of, or separate from, the touch panel. The key 256 may include a physical button, an optical key, or a keypad. The ultrasonic input device 258 may detect ultrasonic waves, which are generated by an input tool, through a microphone 288 to identify data corresponding to the detected ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262, together with the touch panel 252, may be configured as one or more modules. According to an embodiment of the present disclosure, the panel 262 may include a pressure sensor or a POS sensor which may measure a strength of pressure from a user's touch. The pressure sensor may be implemented to be integrated with the touch panel 252, or may be implemented as one or more sensors separate from the touch panel 252. The hologram device 264 may show a three dimensional image in the air by using an interference of light. The projector 266 may display an image by projecting light onto a screen. The screen may be located in the interior of, or on the exterior of, the electronic device 201. The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, a SD interface, card/multi-media card (MMC) interface, or an Infrared Data Association (IrDA) standard interface.

The audio module 280 may convert a sound into an electrical signal, and vice versa. At least some elements of the audio module 280 may be included in the input/output interface 150 illustrated in FIG. 1. The audio module 280 may process sound information that is input or output through a speaker 282, a receiver 284, earphones 286, the microphone 288, and the like.

The camera module 291 is a device that can photograph a still image and a moving image. According to an embodiment of the present disclosure, the camera module 291 may include one or more image sensors (e.g., a front sensor or a rear sensor), a lens, an ISP, or a flash (e.g., an LED or xenon lamp). The power management module 295 may manage the power of the electronic device 201.

The power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure the residual amount of charge for the battery 296 and a voltage, current, or temperature while charging. The battery 296 may include a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, or the like. The electronic device 201 may include a mobile TV support device (e.g., GPU) that may process media data according to a standard, such as digital multimedia broadcasting (DMB), digital video broadcasting (DVB), mediaFlo™, and the like. Each of the above-described component elements of hardware according to embodiments of the present disclosure may be configured with one or more components, and the names of the corresponding component elements may vary based on the type of electronic device. An electronic device 201 may omit some elements or may further include additional elements, or some of the elements of the electronic device may be combined with each other elements to configure one entity, in which case the electronic device may identically perform the functions of the corresponding elements prior to the combination.

Figure 3:
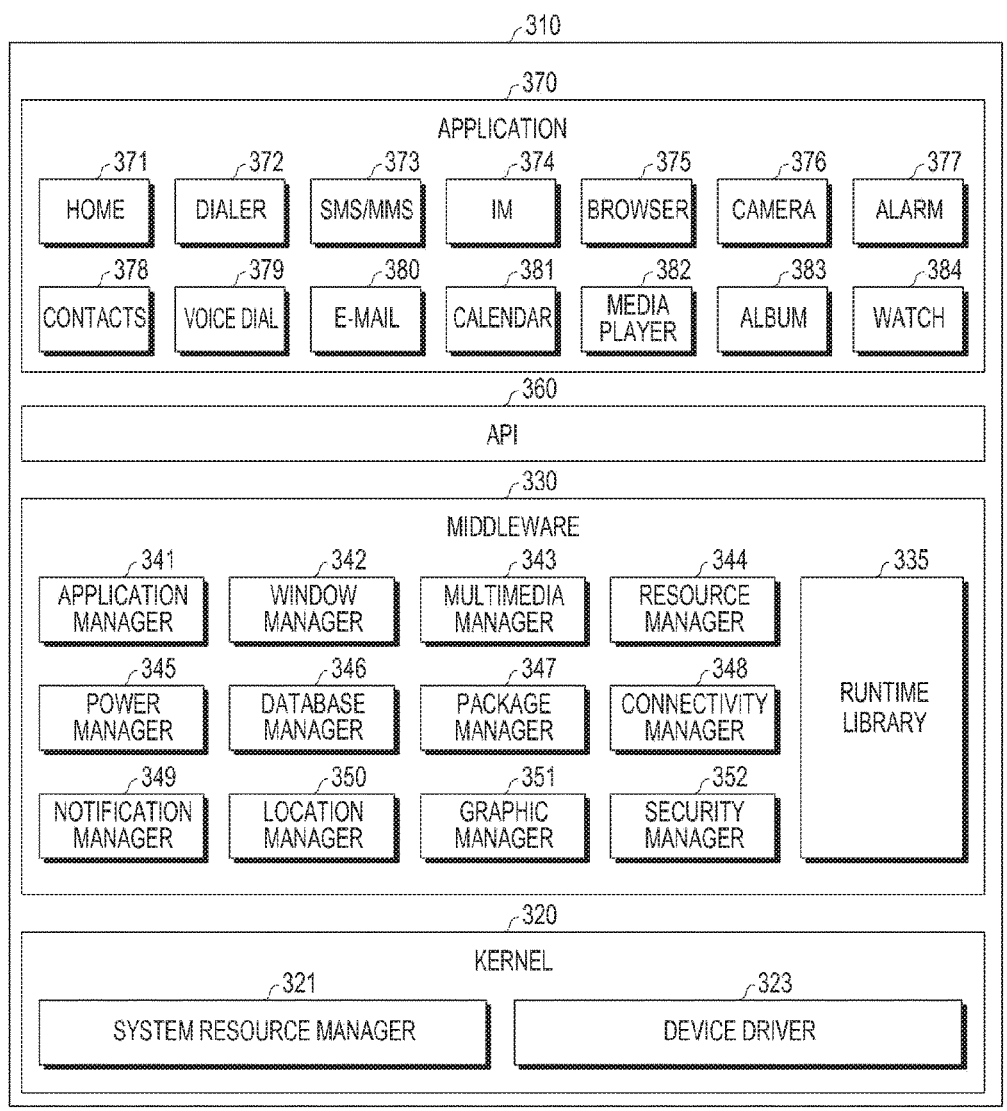
FIG. 3 is a block diagram of a program module according to various embodiments of the present disclosure.

FIG. 3 is a block diagram of a program module according to various embodiments of the present disclosure. The program module 310 may include an operating system (OS) that controls resources relating to an electronic device and/or applications that are driven on the operating system. The operating system may include Android', iOS™, Windows™, Symbian™, Tizen™, or Bada™. Referring to FIG. 3, the program module 310 may include a kernel 320, middleware 330, an API 360, and/or applications 370. At least a part of the program module 310 may be preloaded on the electronic device, or may be downloaded from an external electronic device.

The kernel 320 may include a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include a display driver, a camera driver, a Bluetooth driver, a shared memory driver, a USB driver, a keypad driver, a Wi-Fi driver, an audio driver, or an inter-process communication (IPC) driver. The middleware 330 may provide a function required by the applications 370 in common, or may provide various functions to the applications 370 through the API 360 such that the applications 370 can efficiently use limited system resources within the electronic device. The middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may manage an input/output, manage a memory, or process an arithmetic function. The application manager 341 may manage the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code for the applications 370 or the memory space. The power manager 345 may manage the capacity or power of a battery, and may provide power information required for operating the electronic device. According to an embodiment of the present disclosure, the power manager 345 may operate in conjunction with a basic input/output system (BIOS). The database manager 346 may generate, search, or change databases to be used by the applications 370. The package manager 347 may manage the installation or update of an application that is distributed in the form of a package file.

The connectivity manager 348 may manage a wireless connection. The notification manager 349 may provide an event (e.g., an arrival message, an appointment, a proximity notification, or the like) to a user. The location manager 350 may manage the location information of the electronic device. The graphic manager 351 may manage the graphics provided to a user and a user interface relating to the graphics provided. The security manager 352 may provide system security or user authentication. According to an embodiment of the present disclosure, the middleware 330 may include a telephony manager for managing a voice or video call function of the electronic device, or a middleware module that is capable of forming a combination of the functions of the above-described elements. The middleware 330 may provide specialized modules according to the types of operation systems. Furthermore, the middleware 330 may dynamically remove some of the existing elements, or may add new elements. The API 360 may be a set of API programming functions, and may be provided with different configurations according to the type of the operating system. For example, in the case of Android™ or iOS™, one API set may be provided for each platform, and in the case of Tizen™, two or more API sets may be provided for each platform.

The applications 370 may include one or more applications that can perform functions such as home 371, a dialer 372, SMS/MMS 373, instant messaging (IM) 374, a browser 375, a camera 376, an alarm 377, contacts 378, voice dialing 379, e-mail 380, a calendar 381, a media player 382, an album 383, a watch 384, healthcare applications (e.g., for measuring exercise quantity, or blood glucose level), environment information (e.g., atmospheric pressure, humidity, or temperature information), provision applications, and the like. According to an embodiment of the present disclosure, the applications 370 may include an information exchange application that can support the exchange of information between the electronic device and an external electronic device. The information exchange application may include a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself or some elements thereof, or adjusting the brightness or resolution of a display), or applications executed in the external electronic device. The applications 370 may include applications (e.g., a healthcare application of a mobile medical appliance) that are designated according to the attributes of an external electronic device. The applications 370 may include applications received from an external electronic device. At least some of the program module 310 may be implemented (e.g., executed) by software, firmware, hardware (e.g., the processor 210), or a combination of two or more thereof and may include a module, a program, a routine, an instruction set, or a process for performing one or more functions.

Figure 4:
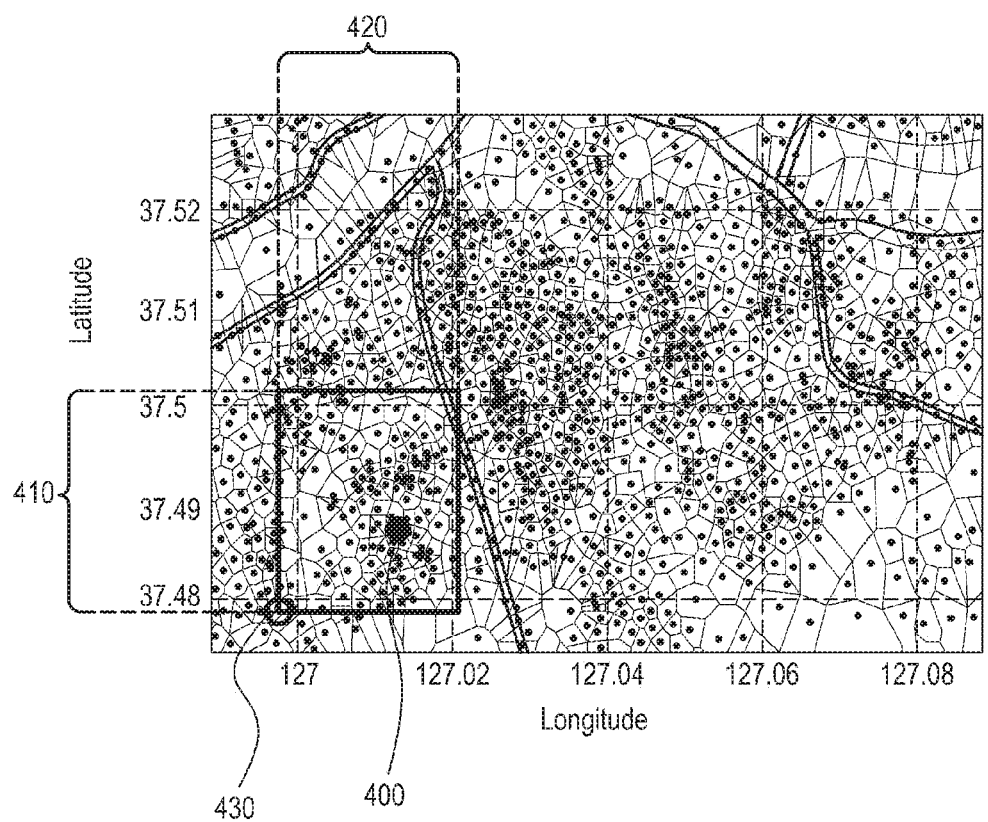
FIG. 4 illustrates a diagram in which a predetermined region is partitioned by tiles having a predetermined size that do not overlap each other according to various embodiments of the present disclosure.

FIG. 4 illustrates a diagram in which a predetermined region is partitioned by tiles having a predetermined size that do not overlap each other.

According to various embodiments of the present disclosure, the predetermined region may be divided into tiles 400 having a predetermined size that do not overlap each other. For example, a specific city or the whole earth may be expressed by a two-dimensional tile defined by latitude and longitude. When a shape of the two-dimensional tile is defined as a quadrangle, a height 410 of the tile 400 may be defined as latitude (e.g., −90 degrees to 90 degrees) and a width 420 of the tile may be defined as longitude (e.g., −180 degrees to 180 degrees). One of the vertexes of the tiles may be selected as a reference point that represents the tiles, and an index for each tile may be configured based on latitude and longitude of the selected reference point. For example, the vertex 430 located at a lower left side of the rectangular tile 400 may be set as the reference point.

In connection with this, Equation (1) calculates a latitude index i and a longitude index j of the tile with latitude or longitude for the reference point of the tile as a parameter.

$$i = \text{floor}\left(\frac{\text{ref\_latitude}_i + 90}{\text{tile\_height}}\right) \quad (1)$$

$$j = \text{floor}\left(\frac{\text{ref\_longitude}_j + 180}{\text{tile\_width}}\right)$$

In Equation (1), the term tile_height denotes a value related to the tile height, for example, a value which may be set based on latitude. In Equation (1), the term tile_width denotes a value related to the tile width, for example, a value which may be set based on longitude. For example, the terms tile_height and tile_width may be set to be a value of 0.01 degrees and 0.02 degrees according to user's setting or automatically. In Equation (1), the term ref_latitude$_i$ denotes latitude and may correspond to latitude for a reference point of an i$^{th}$ tile, and the term ref_longitude$_j$ denotes longitude and may correspond to longitude for a reference point of a j$^{th}$ tile. In Equation (1), floor(x) denotes a function that rounds down values below decimal point of x. For example, the term tile_height (°) may be defined as an angle corresponding to the tile height (km), and the term tile_width (°) may be defined as an angle corresponding to the tile_width (km). In this regard, if the latitude difference between two points on the surface of the earth is 1 degree, the distance between the two points may be calculated as about 111 km.

The latitude for the reference point of the i tile may have a value ranging from −90 degrees to 90 degrees, and thus ref_latitude$_i$+90 degrees may have a value ranging from 0 to 180 degrees. In this case, when the term tile_height is set as 0.02 by the user, i which indicates a latitude index of the tile may be expressed by an integer ranging from 0 to 9000.

The longitude for the reference point of the j$^{th}$ tile may have a value ranging from −180 degrees to 180 degrees, and thus ref_longitude$_j$+180 degrees may have a value ranging from 0 to 360 degrees. In this case, when the term tile_width is set as 0.02 by the user, j which indicates a longitude index of the tile may be expressed by an integer ranging from 0 to 18000.

For example, when the terms tile_height and tile_width are set as 0.02 by the user, ref_latitude$_i$ is 50 degrees and ref_longitude$_j$ is 30 degrees if latitude for a reference point of a particular tile is 50 degrees and longitude is 30 degrees. In this case, based on Equation (1), the latitude index of the particular tile may be 7000 and the longitude index j may be 10500.

Equation (2) corresponds to an inverse function of Equation (1) and calculates latitude and longitude of the tile with the latitude index or the longitude index as a parameter.

ref_latitude$_i$=i×tile_height−90 ref_longitude$_j$=j×tile_width−180     (2)

For example, when the terms tile_height and tile_width are set as 0.02 by the user, latitude and longitude for a reference point of a tile corresponding to a 7000$^{th}$ latitude index and a 10500$^{th}$ longitude index (that is, i=7000 and j=10500) are 50 degrees and 30 degrees, respectively.

According to an embodiment of the present disclosure, the processor may perform Poisson point process (PPP) modeling having an effective cell density $\rho_{i,j}a_{i,j}$(m$^{-2}$) for $T_{i,j}$ having a predetermined tile index (i,j). The term $\rho_{i,j}$ denotes a scaling factor considering an antenna setting such as tilting or sectorization. The term $\rho_{i,j}$ may be set to have a value smaller than 1 and set for each tile. Equation (3) below shows a distribution for a distance from a predetermined location to an n$^{th}$ nearest cell.

$$p_n(\epsilon) = \frac{2e^{-\rho_{i,j}a_{i,j}\pi\epsilon^2}\epsilon^{2n-1}(\rho_{i,j}a_{i,j}\pi)^n}{\Gamma(n)} \quad (3)$$

In Equation (3), the term Γ(n) denotes a gamma function. When n=1, $p_1(\epsilon)$ denotes a distribution for a positioning error to the nearest neighbor (NN) and has a Rayleigh distribution of $\sigma=1/\sqrt{2\rho_{i,j}a_{i,j}\pi}$. Accordingly, the mean of $\epsilon$ is $1/(2(\sqrt{\rho_{i,j}a_{i,j}\pi})$ and a root mean square error (RMSE) is $1/(\sqrt{\rho_{i,j}a_{i,j}\pi})$.

Further, as shown in Equation (4) below, the positioning error may be modeled as Gaussian distribution ~N(0,R) having the mean of 0 and a covariance matrix of R of the positioning error.

$$R = \frac{1}{2\rho_{i,j}a_{i,j}\pi I_2} \text{ or } R = \frac{C}{N} \quad (4)$$

In Equation (4), the term $I_2$ denotes a 2×2 identity matrix and the term R denotes a moving average value according to an update of a reference tile. The term C denotes a control parameter and the term N denotes the number of cells per unit area (m$^{-2}$). At this time, an error covariance value may be inversely proportional to the number of cells per tile. For example, when the number of cells per tile is large, the error may decrease and accuracy (m) may decrease by sqrt (1/N) scaling. The term $a_{i,j}$ denotes the number of cells existing within an (i,j)$^{th}$ tile. The term $\rho_{i,j}$ denotes a scaling factor considering an antenna setting such as tilting or sectorization, and may be statistically estimated using collected information that tags GPS values collected from a predetermined terminal as shown in Equation (5).

$$\rho_{i,j} = E[\rho_{i,j}^{(k)}] = E\left[\frac{1}{4a_{i,j}E[\hat{\epsilon}_k]^2}\right] \quad (5)$$

In Equation (5), when $N_k$ pieces of collected information $\{Z_i^{(k)}\}_{i=1}^{N_k}$ that are collected from a predetermined cell are given, an average error of a cell k is $$E[\hat{\epsilon}_k] = \frac{1}{N_k}\sum_i (Z_i^{(k)} - \hat{X}_k).$$

The term $\rho_{i,j}^{(k)}$ denotes a scaling factor for the cell k, and the scaling factor $\rho_{i,j}$ may be calculated through an averaging process for all cells within the tile. The processor may detect an effective cell density based on the scaling factor. At this time, the scaling factor may be calculated by a server (e.g., the server 106) and transmitted to the electronic device, or may be calculated using the size of a cell-specific variance within a cell DB (database) (e.g., map information of a cellular base station) received by the electronic device.

According to an embodiment of the present disclosure, when a cell density $\rho_{i,j}a_{i,j}$ within the tile (i,j) is given, a possibility, that a probability that a tile-specific positioning error $e_{i,j}$ is larger than $|C_0|$ (distance to the nearest cell) is larger than τ, (i.e., Pr($|C_0| \le e_{i,j}) \ge$ τ) may be acquired through Equation (6) below. In other words, the scaling law of O $(1/\sqrt{a_{i,j}})$ in which, as the cell density becomes sparser, the positioning error becomes larger is followed.

$$e_{i,j} \ge \sqrt{\frac{-\ln(1-\tau)}{\rho_{i,j}a_{i,j}\pi}} \quad (6)$$

In Equation (6), the term τ denotes a value ranging from 0 to 1 and may be set as 0.8 to 0.9 according to an embodiment of the present disclosure. The term $e_{i,j}$ may follow sqrt(1/N) scaling that is the number of cells as described above.

According to an embodiment of the present disclosure, the processor may calculate a minimum cell density $\lambda_{i,j}$ required for satisfying a maximum allowable positioning error D (e.g., 300 m) considering a maximum allowable radius of a POI, and a tile width and height based on Equation (7) below.

$$a_{i,j} \ge \frac{-\ln(1-\tau)}{\rho_{i,j}\pi D^2} \triangleq \lambda_{i,j} \quad (7)$$

In Equation (7), the term $a_{i,j}$ may be proportional to the number N of cells, so that N may be inversely proportional to D$^2$. As shown in Equation (7), when the average cell density $a_{i,j}$ of the reference tile or adjacent tiles is greater than or equal to $\lambda_{i,j}$, a reference tile update may be performed using cellular-based terminal positioning. When the average cell density $a_{i,j}$ is smaller than $\lambda_{i,j}$, the reference tile update may be performed using an network location provider (NLP) and/or GPS positioning result.

Figure 5:
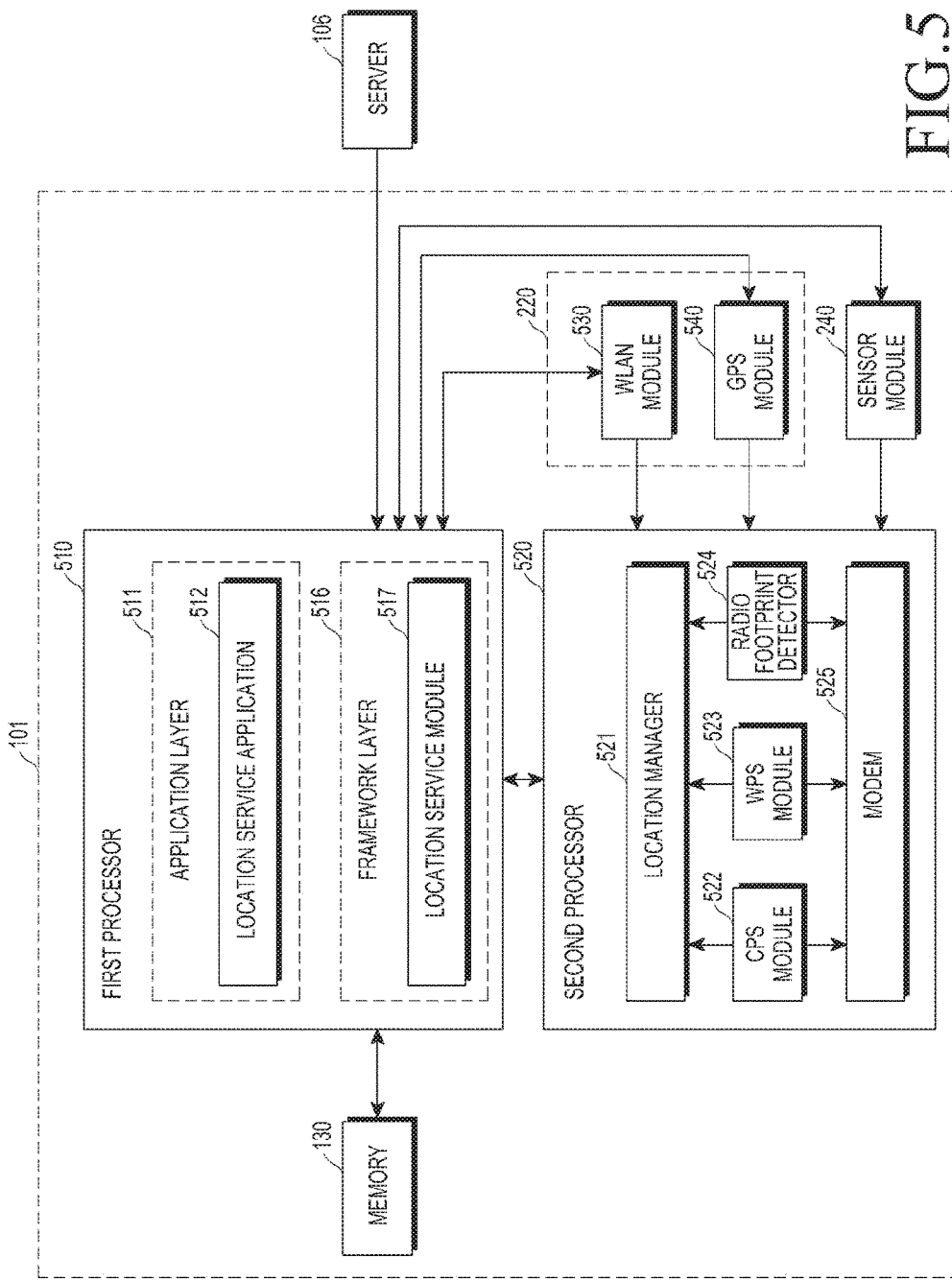
FIG. 5 is a block diagram illustrating an electronic device that determines a location according to various embodiments of the present disclosure.

FIG. 5 is a block diagram illustrating the electronic device that determines a location according to various embodiments of the present disclosure.

Referring to FIG. 5, the electronic device 101 that determines the location according to various embodiments of the present disclosure may include the processor 510, the memory 130, and the communication module 220.

According to various embodiments of the present disclosure, the electronic device 101 may include a first processor 510 (e.g., an AP), a second processor 520 (e.g., a CP), the memory 130, the communication module 220, and the sensor module 240. The first processor 510 may include an application layer 511, and a framework layer 516. The application layer 511 may include a location service application 512. The framework layer 516 may include a location service module 517. Further, the second processor 520 may include a location manager 521, a cellular positioning system (CPS) module 522, a WLAN positioning system (WPS) module 523, a radio footprint detector 524, and a modem 525. The first processor 510 may include the processor 120 and the memory 130. The second processor 520 may include the cellular module 221 of FIG. 2, and may include a CP and internal memory.

According to various embodiments of the present disclosure, the location service application 512 may make a request for the operation of configuring or releasing a geofence from the location service module 517 of the framework layer 516. The geofence refers to a geographical fence surrounding a POI, and the application 512 may configure or release a boundary or a radius of the POI based on a central point of the POI in order to perform geofencing that determines whether the user of the electronic device enters the POI, exits the POI, or dwells in the POI. For example, the location service application 512 may make a request for registering or releasing the geofence to the location service module 517. When receiving the request from the location service application 512, the location service module 517 may perform at least one of inbound detection corresponding to detection of the user with the electronic device entering into a geofence region, outbound detection corresponding to detection of exiting from the geofence region, or dwelling detection corresponding to detection of dwelling in the geofence region based on geofence information related to the central point of a predetermined POI (e.g., latitude and longitude coordinates of the POI and a geofence radius based on the central point). When at least one operation of the inbound detection, the outbound detection, and the dwelling detection of the user having the electronic device is detected, the location service module 517 may transmit a geofencing notification message to the location service application 512.

The inbound detection may refer to detection of a location of the electronic device 101 (e.g. a location of the user having the electronic device 101) from the outside of the geofence to the inside of the geofence or the user dwelling within the geofence through cellular-based positioning or WLAN-based positioning. The outbound detection may refer to detection of a location of the electronic device 101 (e.g., a location of the user having the electronic device 101) from the inside of the geofence to the outside of the geofence or the user not dwelling within the geofence through cellular-based positioning or WLAN-based positioning. The dwelling detection may refer to detection of the location of the electronic device 101 that stays within the geofence for a predetermined time through cellular-based positioning or WLAN-based positioning. When the geofencing is no longer needed, the location service application 512 may transmit a request for releasing the geofence based on the central point to the location service module 517. The location service module 517 having received the request for releasing the geofence may stop performing the geofencing.

According to various embodiments of the present disclosure, in order to register the geofence, the electronic device 101 may need at least one of latitude and longitude of the central point of the POI, the geofence radius based on the central point, a geofencing mode (e.g., entrance, exit, or dwelling), a dwelling reference time, central point geofence wireless footprint information, and other information. The electronic device 101 may acquire a central point-specific single ID number of the registered POI as a result of the registration of the geofence. A different single ID number may be allocated to each POI and may be used as an identifier for distinguishing a plurality of registered POIs.

According to various embodiments of the present disclosure, in order to release the geofence, the electronic device 101 may need a central point ID number that is received when the geofence is registered. The electronic device 101 may acquire information on whether the release of the geofence is successful (e.g., true/false) as a result of the release of the geofence.

According to various embodiments of the present disclosure, the electronic device 101 may receive a notification related to geofencing. The notification related to the geofencing may include at least one of the central point-specific single ID and the geofencing mode (e.g., entrance, exit, or dwelling).

According to various embodiments of the present disclosure, the electronic device 101 may provide the registration of the geofence, the release of the geofence, and the notification related to the geofencing to different applications through software. The electronic device 101 may provide the registration of the geofence, the release of the geofence, and the notification related to the geofencing to different applications through an API.

According to various embodiments of the present disclosure, the location service module 517 of the first processor 510 may provide an API for the registration of the geofence, the release of the geofence, and the notification related to the geofencing to the location manager 521 of the second processor 520. Further, the location service module 517 may be connected to modules such as the memory 130, the server 106, the WLAN module 530, a GPS 540, and the sensor module 240.

According to various embodiments of the present disclosure, the geofencing, calculations, and determinations for the geofencing may be performed by the location manager 521 of the second processor 520.

According to various embodiments of the present disclosure, when the first processor 510 is operating for another service or cannot efficiently perform the calculations and determinations for the geofencing, the operation related to at least one of the registration of the geofence, the release of the geofence, and the notification related to the geofencing and/or the calculations and determinations may be performed by the location manager 521. The calculations and determinations may be at least one of the operations performed below.

According to various embodiments of the present disclosure, the second processor 520 may include the location manager 521 that manages the operation related to the geofencing, the modem 525 that processes cellular data, the CPS module 522 that performs positioning based on cellular data, the WPS module 523 that performs positioning based on a WLAN signal, and the radio footprint detector 524 that performs footprint-based detection based on cellular data and WLAN data. The second processor 520 may periodically wake up from a sleep state in order to be connected to a cellular base station. The second processor 520 may perform cellular-based positioning after being awoken from a sleep state. The electronic device 101 may measure the location of the electronic device 101 based on the periodic being awoken from a sleep state operation without additional current consumption. When the electronic device 101 performs cellular-based positioning, the geofencing accuracy of the cellular-based positioning may be relatively low compared to WLAN-based positioning since the service coverage of the cellular base station is wide.

According to various embodiments of the present disclosure, when the geofence for the POI is registered or released through the first processor 510, the electronic device 101 may identify a tile corresponding to the POI on which the geofence is registered or released through the second processor 520. The second processor 520 may set the POI on which the geofence is registered or released as a reference tile or may set a tile search area based on the POI on which the geofence is registered or released. The second processor 520 may store a tile index of the identified tile in the memory. The second processor 520 may acquire map information from the server 106 based on the tile index stored in the memory. The map information stored in a database of the server 106 may include information on a plurality of tiles partitioned by latitude and longitude of a sphere-shaped globe, and may include information on a WLAN base station (e.g., Wi-Fi AP) and/or a cellular base station included in a particular region. The second processor 520 may generate a first POI list and a second POI list based on the map information acquired from the server 106. Further, the second processor 520 may receive the first POI list or the second POI list from the server 106 based on the tile index stored in the memory.

According to various embodiments of the present disclosure, the electronic device 101 may periodically perform cellular positioning-based geofencing in a low power state. The electronic device 101 may identify proximity to a predetermined geofence through geofencing. When the user with the electronic device 101 approaches the geofence, the electronic device 101 may perform more accurate positioning through WLAN-based geofencing.

According to various embodiments of the present disclosure, the memory 130 may include at least a part of at least one piece of cellular map information and at least one piece of WLAN map information. The memory 130 may be divided into a memory associated with the first processor 510 and a memory associated with the second processor 520. Each of the pieces of map information may be updated based on data received from the server 106 according to instructions from the location service module 517 and the location manager 521. The WLAN map information may be generated to be suitable for a corresponding region by processing and loading a WLAN base station database, not a simple subset of the whole WLAN database stored in the server 106.

At least one of the database for at least one cellular base station and the database for at least one WLAN base station stored in the electronic device 101 may be at least a part of the database stored in the server 106. At least the part of the database may be acquired based on cellular data acquired from the cellular base station or the WLAN base station received by the electronic device 101.

According to various embodiments of the present disclosure, the server 106 may possess and manage information on at least one cellular base station and at least one WLAN base station. The server 106 may transmit map information including at least the part of the database for at least one cellular base station and at least one WLAN base station based on a request from the electronic device 101. The electronic device 101 may perform positioning based on at least a part of the map information received from the server 106.

According to various embodiments of the present disclosure, the server 106 may transmit at least a part of the database for at least one WLAN base station based on cellular data included in the request from the electronic device 101. The electronic device 101 may perform WLAN-based positioning based on the WLAN data acquired from the WLAN base station and at least the part of the database for the WLAN base station.

According to various embodiments of the present disclosure, the CPS module 522 of the second processor 520 may reflect a characteristic of the periodic operation of the second processor, and position or track the location of the electronic device 101 based on cellular data. In order to more accurately use cellular network information for the positioning of the electronic device 101, the cellular-based positioning may estimate map information for at least one cellular base station and the location of the electronic device 101 based on the map information. In the cellular-based positioning, the map information of the cellular base station may include information on a transmission point of the cell, an inner coverage indicating a region in which communication is possible through access to the cell, or an outer coverage indicating a region which may be measured as an adjacent base station through communication by access to another cell. In the cellular-based positioning, the map information of the cellular base station may include base station-related information of base stations included in a tile transmitted from the electronic device 101 to the server 106. Further, the electronic device 101 may estimate the location of the electronic device based on information on a region considering mobility of the electronic device and a plurality of transmission points belonging to one cell. For example, the electronic device may add a region predicted by a movement characteristic of the electronic device to a process of calculating the overlapping region, and may select a transmission point having a high probability of access to a cell including a plurality of transmission points and use the selected transmission point for the process of calculating the overlapping region.

When a signal strength of a particular adjacent cell is strong, the electronic device may add an outer region of the corresponding adjacent cell to the process of calculating the overlapping region. The method of calculating the position of the overlapping region between the inner region and the outer region based on information on the adjacent cell may more accurately estimate the location of the electronic device compared to the conventional cellular-based positioning. When it is determined that the electronic device 101 approaches the geofence region through the cellular-based positioning, the electronic device 101 may perform WLAN-based geofencing.

According to various embodiments of the present disclosure, an electronic device for determining a location may include a communication interface; and a processor, wherein the processor receives information from a cellular base station from at least one cellular base station to predict a location of the electronic device and reflect information on at least one WLAN base station in the predicted location to determine the location of the electronic device. The information on the cellular base station may include map information of the cellular base station, and the information on the WLAN base station may include map information on the WLAN base station.

According to an embodiment of the present disclosure, the electronic device may further include a memory for storing map information of at least one WLAN base station, and the map information of the WLAN base station may correspond to a region positioned based on the received information on the cellular base station.

According to an embodiment of the present disclosure, the processor may predict latitude and longitude of the electronic device based on the received information from the cellular base station, calculate a probability value based on a probability density function for a matching degree between the predicted latitude and longitude, and a predetermined region of the electronic device, compare the calculated probability value with a first threshold value, and determine whether the electronic device exists within the predetermined region or not.

According to an embodiment of the present disclosure, when the calculated probability value is larger than a first threshold value, the processor may determine that the electronic device exists within the predetermined region, and when the calculated probability value is not larger than the first threshold value, determine that the electronic device does not exist within the predetermined region.

According to an embodiment of the present disclosure, when the calculated probability value is larger than not only the first threshold value but also a second threshold value, which is larger than the first threshold value, the electronic device may finally determine that the electronic device exists within the predetermined region without performing WLAN-based geofencing.

According to an embodiment of the present disclosure, when the location of the electronic device is determined by reflecting the information on at least one WLAN base station, the processor may acquire the information on at least one WLAN base station by scanning the surroundings of the electronic device. Subsequently, the electronic device may estimate the location of the electronic device by comparing the map information of at least one WLAN base station stored in the memory of the electronic device with the scanned and acquired information on the WLAN base station.

According to an embodiment of the present disclosure, the processor may calculate a distance between a central point of the POI and the estimated location of the electronic device, compare the calculated distance with a radius of the POI, and determine whether the electronic device exists within the POI or not.

According to an embodiment of the present disclosure, when the calculated distance is shorter than the radius, the processor may determine that the electronic device exists within the POI, and when the calculated distance is longer than the radius, determine that the electronic device does not exist within the POI.

Figure 6:
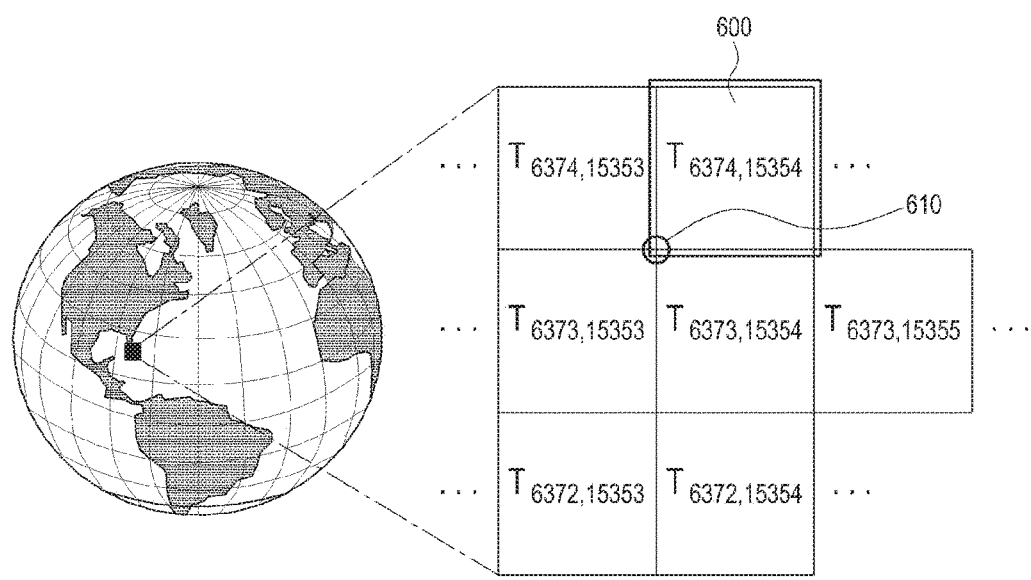
FIG. 6 illustrates tiles having a predetermined size that do not overlap each other according to various embodiments of the present disclosure.

FIG. 6 illustrates tiles having a predetermined size that do not overlap each other according to various embodiments of the present disclosure.

According to various embodiments of the present disclosure, a predetermined region may be partitioned by tiles having a predetermined size that do not overlap each other. For example, a specific city or the whole earth may be divided into tiles in a quadrangle form defined by latitude and longitude. In general, the tile may have a rectangular shape, but may be shown as a trapezoidal shape in some regions in order to divide the sphere-shaped earth into tiles that do not overlap each other. A plurality of tiles that divide a predetermined region may be mutually exclusive and collectively exhaustive. The plurality of tiles that divide the predetermined region may be defined as $T_{i,j}$ based on Equation (8).

$$T_{i,j} = \left\{ A \in R^2 \middle| \begin{array}{l} 0 < A\text{'s latitude} - \text{ref\_latitude}_i < \text{tile\_height} \\ 0 < A\text{'s longitude} - \text{ref\_longitude}_j < \text{tile\_width} \end{array} \right\} \quad (8)$$

FIG. 6 illustrates an example of a tile structure, and corresponds to a case where tile_height and tile_width are set as 0.02 by the user. Referring to FIG. 6, latitude and longitude coordinates for a reference point of a tile 600 defined as $T_{6374,15354}$ may be (6374,15354). The tile 600 defined as $T_{6374,15354}$ may include all points A that are satisfied with the condition of Equation (8). In other words, a set of all points A that are satisfied with the condition of Equation (8) may be expressed by the rectangular tile 600 defined as $T_{6374,15354}$.

According to various embodiments of the present disclosure, the location service application 512 included in the first processor 510 of the electronic device 101 may make a request for an operation related to geofencing to the location service module 517 of the framework layer 516. For example, the location service application 512 may make a request for registering or releasing the geofence to the location service module 517.

When receiving the request for registering the geofence related to pre-registration of a plurality of POIs from the location service application 512, the location service module 517 may map the plurality of POIs to corresponding tiles based on geofence information related to a central point of each of the plurality of POIs. When the mapping between the plurality of POIs and the tiles is completed, information on the plurality of POIs and the mapping information may be stored in the memory of the electronic device 101 or a memory of a server located outside the electronic device 101. Equation (9) defines a set $S_{i,j}$ of POIs mapped to tiles $T_{i,j}$ among N POIs ($P_1$ to $P_N$).

$$S_{i,j} = \{Y | Y \in T_{i,j} \cap S\}$$

$$S = \{P_i \in R^2 | i=1,2,\ldots,N\} \quad (9)$$

In Equation (9), the term S denotes a set of N POIs ($P_1$ to $P_N$) on which the request for registering the geofence is made, and the term $S_{i,j}$ denotes a set of POIs included in tiles $T_{i,j}$ among the POIs ($P_1$ to $P_N$) included in S.

According to an embodiment of the present disclosure, the POIs included in $S_{i,j}$ may be defined using latitude and longitude for the central point of each POI. For example, latitude and longitude for the central point of the POI included in $S_{6374,15354}$ may correspond to one of the points A located within the rectangular region 600 defined by $T_{6374,15354}$.

The POIs included in $S_{i,j}$ may be defined to include an additional search condition as well as the latitude and longitude. The additional search condition for defining POIs may include date or time information, altitude information, information on radio fingerprint such as cellular, Wi-Fi, and BT, activation information of an AP, or URL information from which additional information related to a POI can be acquired. For example, when it is identified that the electronic device enters the POI through a cellular communication network, the processor of the electronic device may additionally use information on a Wi-Fi or BT network, which is used for defining the POI, in order to increase the accuracy of whether the electronic device enters or not.

Equation (10) newly defines all of the sets S to make the POIs ($P_1$ to $P_N$), on which the request for registering the geofence is made, include the additional search condition.

$$S=\{P_i(\text{time,altitude,radio,AP status})\} \quad (10)$$

In Equation (10), time denotes date or time information, altitude denotes altitude information, radio denotes a media access control (MAC) address and signal strength information of adjacent Wi-Fi, and BT AP(s), and AP status denotes on/off state information of an AP.

According to an embodiment of the present disclosure, a process of storing and identifying an additional search condition for a predetermined $P_i$ may be accompanied, and a process of identifying the additional search condition used for defining the predetermined $P_1$ may be performed only in a case (e.g., inbound) where the electronic device 101 enters a predetermined POI included in a POI search list.

FIGS. 7A to 7E illustrate a method of identifying a reference tile and tiles adjacent to the reference tile according to various embodiments of the present disclosure.

The processor of the electronic device 101 according to various embodiments of the present disclosure may predict a current location of the electronic device through a cellular communication network. A region corresponding to the predicted current location may be partitioned into a plurality of tiles, and the processor may configure the tile including the predicted current location among the plurality of tiles as a reference tile. The reference tile which corresponds to the tile including the current location of the electronic device 101 may be changed according to movement of the electronic device.

According to an embodiment of the present disclosure, among the plurality of tiles including the current location of the electronic device or the region corresponding to the location designated by the user of the electronic device, the reference tile including the current location of the electronic device or the location designated by the user of the electronic device may be used as a search area in which a POI is searched for. The processor may configure the reference tile including the current location of the electronic device or the location received from the user of the electronic device as the search area in which the POI is searched for.

Figure 7A:
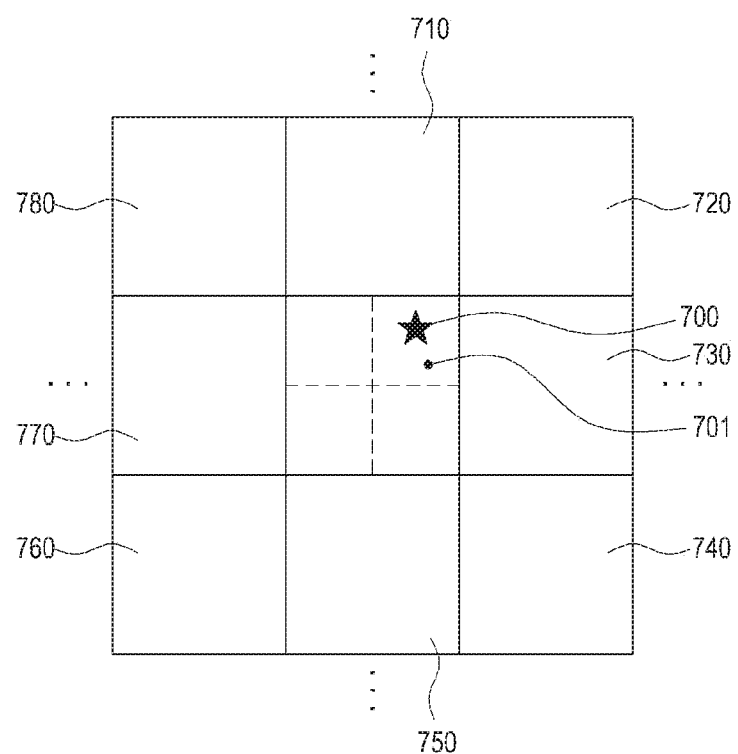
FIGS. 7A to 7E illustrate a method of identifying a reference tile and tiles adjacent to the reference tile according to various embodiments of the present disclosure.

FIG. 7A illustrates a region corresponding to a current location 700 of the electronic device, and the corresponding region may be partitioned into a plurality of tiles having a predetermined size and shape. For example, the region corresponding to the current location 700 of the electronic device may be partitioned into rectangular tiles, and lattice-type boundary lines may be marked in the corresponding region partitioned into the rectangular tiles.

According to an embodiment of the present disclosure, the processor may identify a tile 701 including the current location of the electronic device as the reference tile. When the reference tile 701 is identified, the processor may identify at least one adjacent tile that neighbors the reference tile 701. The adjacent tile may refer to a tile that shares boundaries having a predetermined length with the reference tile 701. Further, the adjacent tile may refer to a tile that does not share the boundaries with the reference tile 701 but is spaced apart from the reference tile 701 by a predetermined length. For example, the processor may identify tiles 710, 730, 750, and 770 that share boundaries having a predetermined length or longer with the reference tile 701 as adjacent tiles. Further, the processor may identify tiles 720, 740, 760, and 780 that do not share a boundary having the predetermined length or longer with the reference tile 701 but share vertexes as adjacent tiles. In addition, the processor may identify tiles that are spaced farther from the reference tile 701 compared to the adjacent tiles 710 to 780 but located within a threshold distance according to a user's setting as adjacent tiles.

The reference tile 701 according to an embodiment of the present disclosure may be partitioned into four quadrants by virtual x and y axes passing through the central point of the reference tile 701. For example, the current location 700 of the electronic device marked in FIG. 7A may be identified to be located on the first quadrant of the reference tile 701.

FIGS. 7B to 7E illustrate a method of selecting a tile to be searched for among the plurality of adjacent tiles located around the reference tile.

According to various embodiments of the present disclosure, the processor may receive information related to the region corresponding to the current location 700 of the electronic device 101. The corresponding region may be partitioned into a plurality of tiles having a predetermined size and shape. The predetermined size and shape may be defined as a rectangular shape having a constant size according to a user's setting.

Figure 7B:
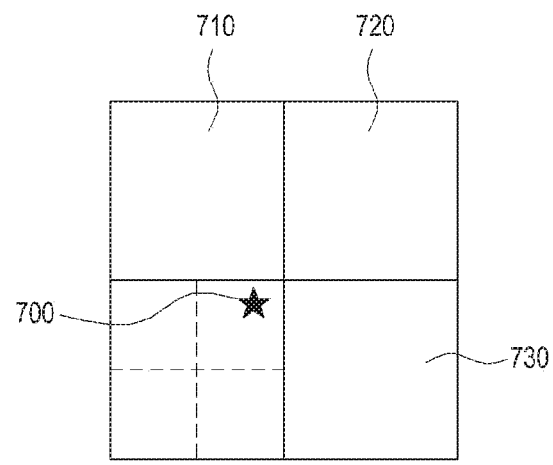

Referring to FIG. 7B, the current location 700 of the electronic device is marked in the tile located at a lower left side. The processor may identify the lower left tile including the current location 700 of the electronic device as the reference tile.

According to an embodiment of the present disclosure, the reference tile defined as a rectangle may be partitioned into four quadrants by virtual x and y axes passing through the central point of the reference tile. The current location 700 of the electronic device illustrated in FIG. 7B may be included in the first quadrant among the quadrants of the reference tile. The electronic device included in the first quadrant of the reference tile may have a high probability to move to another quadrant within the reference tile or the tile 710, 720, or 730 adjacent to the first quadrant in the future. In this case, configuring tiles except for the tiles 710, 720, and 730 adjacent to the first quadrant among the plurality of tiles adjacent to the reference tile as a search area may be inefficient. Accordingly, when it is determined that the current location 700 of the electronic device exists on the first quadrant, the processor may not identify all of the plurality of tiles adjacent to the reference tile as the search area but may identify only the tiles adjacent to the first quadrant as the search area.

Figure 7C:
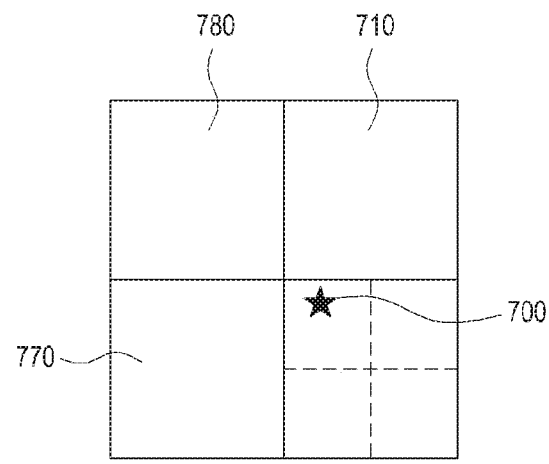

Referring to FIG. 7C, the current location 700 of the electronic device is marked on a tile located at a lower right side. The processor may identify the lower right tile including the current location 700 of the electronic device as the reference tile.

According to an embodiment of the present disclosure, the reference tile defined as a rectangle may be partitioned into four quadrants by virtual x and y axes passing through the central point of the reference tile. The current location 700 of the electronic device illustrated in FIG. 7C may be included in the second quadrant among the quadrants of the reference tile. The electronic device included in the second quadrant of the reference tile may have a high probability to move to another quadrant within the reference tile, or the tile 710, 770, or 780 adjacent to the second quadrant in the future.

In this case, configuring tiles except for the tiles 710, 770, and 780 adjacent to the second quadrant among the plurality of tiles adjacent to the reference tile as a search area may be inefficient. Accordingly, when it is determined that the current location 700 of the electronic device exists on the second quadrant, the processor may not identify all the plurality of tiles adjacent to the reference tile as the search area but may identify only the tiles adjacent to the second quadrant as the search area.

Figure 7D:
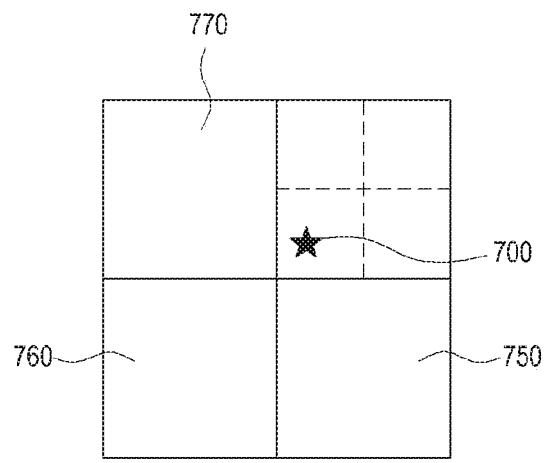

Referring to FIG. 7D, the current location 700 of the electronic device may be marked on a tile located at an upper right side. The processor may identify the upper right tile including the current location 700 of the electronic device as the reference tile. According to an embodiment of the present disclosure, the reference tile defined as a rectangle may be partitioned into four quadrants by virtual x and y axes passing through the central point of the reference tile. The current location 700 of the electronic device illustrated in FIG. 7D may be included in the third quadrant among the quadrants of the reference tile. The electronic device included in the third quadrant of the reference tile may have a high probability to move to another quadrant within the reference tile, or the tile 750, 760, or 770 adjacent to the third quadrant in the future. In this case, configuring tiles except for the tiles 750, 760, and 770 adjacent to the third quadrant among the plurality of tiles adjacent to the reference tile as a search area may be inefficient. Accordingly, when it is determined that the current location 700 of the electronic device exists on the third quadrant, the processor may not identify all the plurality of tiles adjacent to the reference tile as the search area but may identify only the tiles adjacent to the third quadrant as the search area.

Figure 7E:
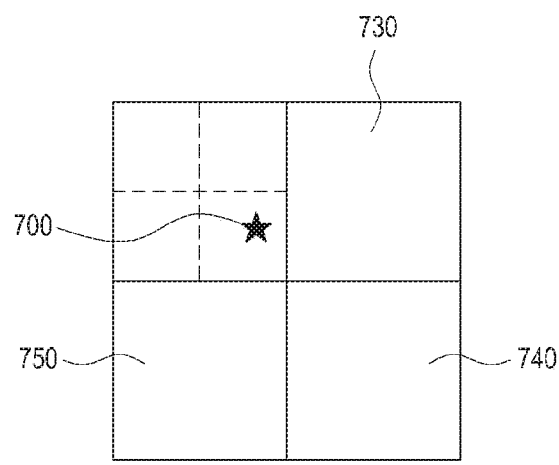

Referring to FIG. 7E, the current location 700 of the electronic device is marked on an upper left side. The processor may identify the upper left tile including the current location 700 of the electronic device as the reference tile.

According to an embodiment of the present disclosure, the reference tile defined as a rectangle may be partitioned into four quadrants by virtual x and y axes passing through the central point of the reference tile. The current location 700 of the electronic device illustrated in FIG. 7E may be included in the fourth quadrant among the quadrants of the reference tile. The electronic device included in the fourth quadrant of the reference tile may have a high probability to move to another quadrant within the reference tile or the tile 730, 740, or 750 adjacent to the fourth quadrant in the future. In this case, configuring tiles except for the tiles 730, 740, and 750 adjacent to the fourth quadrant among the plurality of tiles adjacent to the reference tile as a search area may be inefficient. Accordingly, when it is determined that the current location 700 of the electronic device exists on the fourth quadrant of the reference tile, the processor may not identify all the plurality of tiles adjacent to the referent tile as a search area, but may identify only the tiles adjacent to the fourth quadrant as the search area.

Equation (11) below shows a set of "close POIs" to the current location 700 of the electronic device. The "close POIs" may refer to POIs included in adjacent tiles that are identified as the search area among a plurality of tiles adjacent to the reference tile.

$$\overline{S}_{i,j} = \begin{cases} S_{i,j}^{(1)} \text{ when the device is in } 1^{st} \text{ quadrant in } T_{i,j}, \\ S_{i,j}^{(2)} \text{ when the device is in } 2^{nd} \text{ quadrant in } T_{i,j}, \\ S_{i,j}^{(3)} \text{ when the device is in } 3^{rd} \text{ quadrant in } T_{i,j} \text{ and} \\ S_{i,j}^{(4)} \text{ when the device is in } 4^{th} \text{ quadrant in } T_{i,j} \end{cases} \quad (11)$$

where, $$S_{i,j}^{(1)} = S_{i,j} \cup S_{i+1,j} \cup S_{i,j+1} \cup S_{i+1,j+1}$$
$$S_{i,j}^{(2)} = S_{i,j} \cup S_{i+1,j} \cup S_{i,j-1} \cup S_{i+1,j-1}$$
$$S_{i,j}^{(3)} = S_{i,j} \cup S_{i-1,j} \cup S_{i,j-1} \cup S_{i-1,j-1}$$
$$S_{i,j}^{(4)} = S_{i,j} \cup S_{i-1,j} \cup S_{i,j+1} \cup S_{i-1,j+1}$$

For example, when the current location of the electronic device is included in the first quadrant of the reference tile $T_{i,j}$, $S_{i,j}^{(1)}$ may refer to a set of POIs included in adjacent tiles $T_{i,j}$, $T_{i+1,j}$, $T_{i,j+1}$, $T_{i+1,j+1}$ identified as the search area among a plurality of tiles adjacent to the reference tile $T_{i,j}$.

According to an embodiment of the present disclosure, the tiles adjacent to the first to fourth quadrants identified as the search area and the reference tile may be set as the search area for finding a POI. The processor may identify POIs included in the tiles set as the search area and generate a list related to the identified POIs. The generated list may include all or some of the POIs included in the search area and also include additional search condition information related to each POI. The list may be generated by the processor, but the processor may receive a list that has been already generated by the server.

FIGS. 7B to 7E illustrate embodiments of partitioning the reference tile, and a method of partitioning the reference tile is not limited to the embodiments of the present disclosure. Further, the search area may be identified by additionally partitioning the adjacent tiles other than the reference tile.

The shape of the tile may be defined in various types of shapes as well as the rectangle. For example, the shape of the tile may be defined as a regular pentagon or a regular hexagon, and some tiles may be defined as a trapezoidal shape to partition the sphere-shaped earth.

Figure 8A:
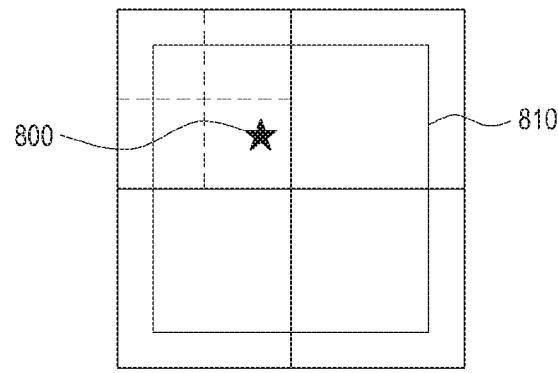
FIGS. 8A and 8B illustrate a method of modifying the search area based on movement of the electronic device according to various embodiments of the present disclosure.
Figure 8B:
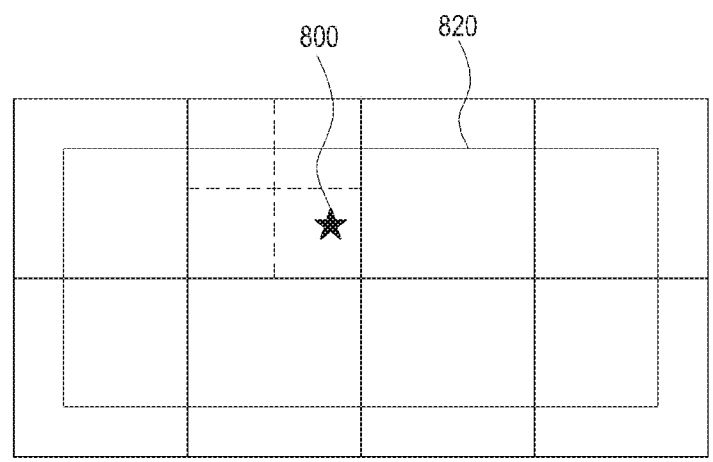

FIGS. 8A and 8B illustrate a method of modifying the search area based on movement of the electronic device according to various embodiments of the present disclosure.

FIG. 8A illustrates a diagram in which a region corresponding to a current location 800 of the electronic device is partitioned into four rectangular tiles. The processor may identify an upper left tile including the current location 800 of the electronic device among the four tiles as a reference tile. The processor may determine that the current location 800 of the electronic device is included in the fourth quadrant of the reference tile. When the electronic device is located on the fourth quadrant of the reference tile, the processor may identify the reference tile and three tiles adjacent to the fourth quadrant as the search area for finding a POI.

Within the four tiles identified as the search area, the processor may set a threshold area 810 for determining whether the electronic device moves. The threshold area 810 may be used as a condition for changing an already identified search area. For example, when it is determined that the electronic device dwells within the threshold area 810, the processor may maintain the already identified search area as the search area for finding the POI. In contrast, when it is determined that the electronic device exits from the threshold area 810, the processor may determine that the location of the electronic device changed and identify a new location of the electronic device. The processor may identify a new reference tile based on the newly identified current location of the electronic device, and may identify new adjacent tiles based on the newly identified reference tile.

According to an embodiment of the present disclosure, the processor may periodically determine the current location of the electronic device. Through the periodic determination, the processor may determine whether the location of the electronic device has changed. When the current location of the electronic device is different from a location of the electronic device determined in a previous period, the processor may determine that the electronic device has moved. When the location of the electronic device has changed, the processor may determine where the electronic device is located based on the threshold area 810.

When the electronic device dwells within the threshold area 810, the processor may measure a time for which the electronic device dwells within the threshold area 810. When the measured dwelling time is greater than or equal to a threshold time, the processor may update the generated search list based on the search area. For example, POIs included in an already generated first search list may include information on all POIs included in the search area. The processor may generate a second search list including POIs located within a predetermined distance from the current location of the electronic device among the POIs included in the first search list. The POIs included in the generated second search list may be POIs selected based on an additional search condition including date or time information containing the current location 800 of the electronic device, altitude information, information on radio fingerprint such as cellular, Wi-Fi, and BT, activation information of an AP, or URL information from which additional information related to the POIs can be acquired.

When the electronic device exits from the threshold area 810, the processor may newly identify the current location of the electronic device. For the operation of identifying the current location of the electronic device, map information of a cellular base station received from the cellular base station may be used. Further, for accurate positioning of the electronic device, the processor may use information acquired from the WPS module 523 that performs positioning based on a GPS, a NLP, and a WLAN signal, and the radio footprint detector 524 that performs footprint-based detection based on cellular data and WLAN data. The processor may newly identify and update the reference tile based on the newly identified current location of the electronic device. When the update of the reference tile is completed, the processor may identify adjacent tiles based on the updated reference tile and identify a new search area based on the reference tile and the adjacent tiles.

FIG. 8B illustrates a diagram in which the region corresponding to the current location 800 of the electronic device is partitioned into eight rectangular tiles.

According to an embodiment of the present disclosure, the processor may partition the sphere-shaped earth into a plurality of rectangles. The earth partitioned into the plurality of rectangles may include lattice type boundaries. Tiles in various shapes may be used for a process of partitioning the sphere-shaped earth into the plurality of tiles to be mutually exclusive and collectively exhaustive. For example, since longitude becomes relatively smaller as latitude becomes larger, tiles corresponding to high latitude among the tiles partitioning the earth may be configured in a trapezoidal shape having an upper base shorter than a lower base. Further, since the number of tiles that may be included in a unit area increases as latitude becomes larger, the number of tiles partitioning a region corresponding to high latitude may be larger than the number of tiles partitioning a region corresponding to low latitude having the same area.

According to an embodiment of the present disclosure, the region including the four tiles illustrated in FIG. 8A is the region corresponding to low latitude, and the region including the eight tiles illustrated in FIG. 8B is the region corresponding to high latitude. In this case, the area of the four tiles in FIG. 8A may be the same as the area of the eight tiles in FIG. 8B. Further, the area of the threshold area 810 in FIG. 8A may be the same as the area of a threshold area 820 in FIG. 8B.

Figure 9:
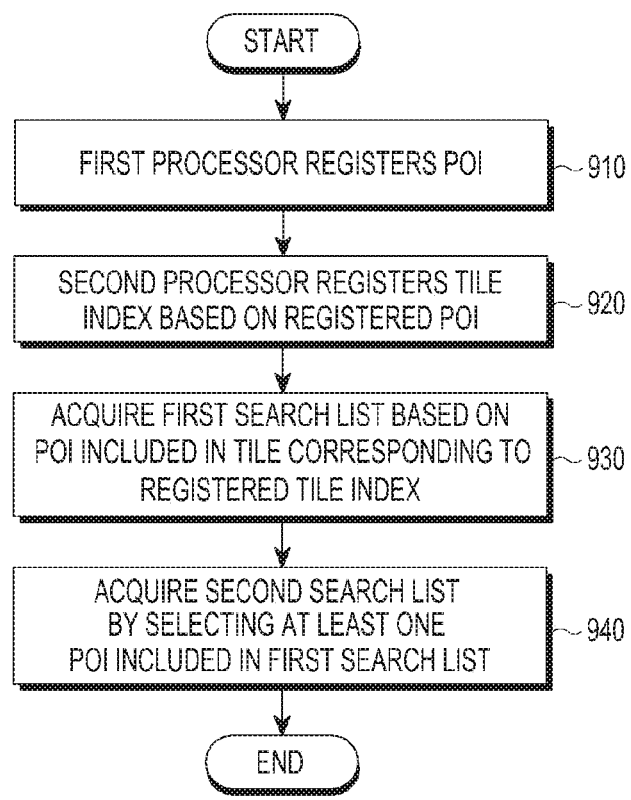
FIG. 9 is a flowchart illustrating a method of registering or releasing a POI according to various embodiments of the present disclosure.

FIG. 9 is a flowchart illustrating a method of registering or releasing a POI according to various embodiments of the present disclosure.

In step 910, the first processor 510 (e.g., AP) may register or release the POI. For example, the first processor may receive a request for registering a predetermined point as a first PIO from the user of the electronic device. Alternatively, the first processor may receive a request for registering the current location of the electronic device as the first POI. In this case, the location service application 512 included in the first processor may make a request for an operation of configuring or releasing a geofence on the requested first POI to the location service module 517 of the framework layer 516. The geofence refers to a geographical fence surrounding the POI, and the location service application 512 may configure or release a boundary or a radius of the POI based on a central point of the POI in order to perform geofencing that determines whether the user having the electronic device enters the POI, exits from the POI, or dwells in the POI.

The first processor may store information on the first POI for which the registration is requested in the memory 130. The information on the first POI may include coordinates corresponding to the first POI, or information on the geofence surrounding the first POI.

In step 920, the second processor 520 (e.g., CP) may register a tile index corresponding to the first POI registered through the first processor. According to an embodiment of the present disclosure, a predetermined region may be partitioned by tiles (e.g., the tile 400) having a predetermined size that do not overlap each other. For example, a specific city or the whole earth may be expressed by a two-dimensional tile defined by latitude and longitude. The second processor may select one of the vertexes of the tiles as a reference point that represents the tiles, and configure an index for each tile based on latitude and longitude of the selected reference point. For example, the vertex 430 located at a lower left side of the rectangular tile 400 may be set as the reference point. The tile size or shape may be preset by the user, and information such as the tile and the tile index may be pre-stored in the memory 130 of the electronic device 101, or the database of the server 106.

The second processor may receive the information on the first POI registered through the first processor from the first processor. The second processor may identify the tile including the registered first POI based on the received information. For example, after identifying the first tile including the first POI registered through the first processor, the second processor may store the information on the registered first POI and the information on the tile such as the tile index of the first tile in the memory of the electronic device 101. That is, the second processor may identify the tile index corresponding to the registered first POI. At this time, the memory 130 may be divided into a memory associated with the first processor 510, and a memory associated with the second processor 520.

In step 930, the second processor 520 may acquire a first search list based on the POI included in the tile corresponding to the registered tile index. For example, the first tile corresponding to the registered tile index may further include at least one POI as well as the first POI registered through the first processor. The first tile may include a plurality of registered POIs as well as a first POI newly registered through the first processor.

In this case, the second processor may acquire the first search list based on the plurality of POIs included in the first tile. The first search list may be generated by the second processor or the first processor. Further, the second processor may receive a first search list pre-stored in the server 106.

A tile that can be used for configuring the first search list is not limited to the first tile, and may include the first tile and a plurality of tiles adjacent to the first tile. For example, the first search list may be configured using POIs included in the plurality of tiles adjacent to the first tile.

In step 940, the second processor may acquire a second search list including at least one of the POIs included in the first search list. For example, the second processor may select only POIs that are close to the user having the electronic device 101 or match an additional search condition among the plurality of POIs included in the first search list, and acquire the second search list including the selected POIs. The second search list may be generated by the second processor or the first processor. Further, the second processor may receive a second search list pre-stored in the server 106. At this time, the additional search condition for defining POIs may include date or time information, altitude information, information on radio fingerprint such as cellular, Wi-Fi, and BT, activation information of an AP, or URL information from which additional information related to a POI can be acquired.

Figure 10:
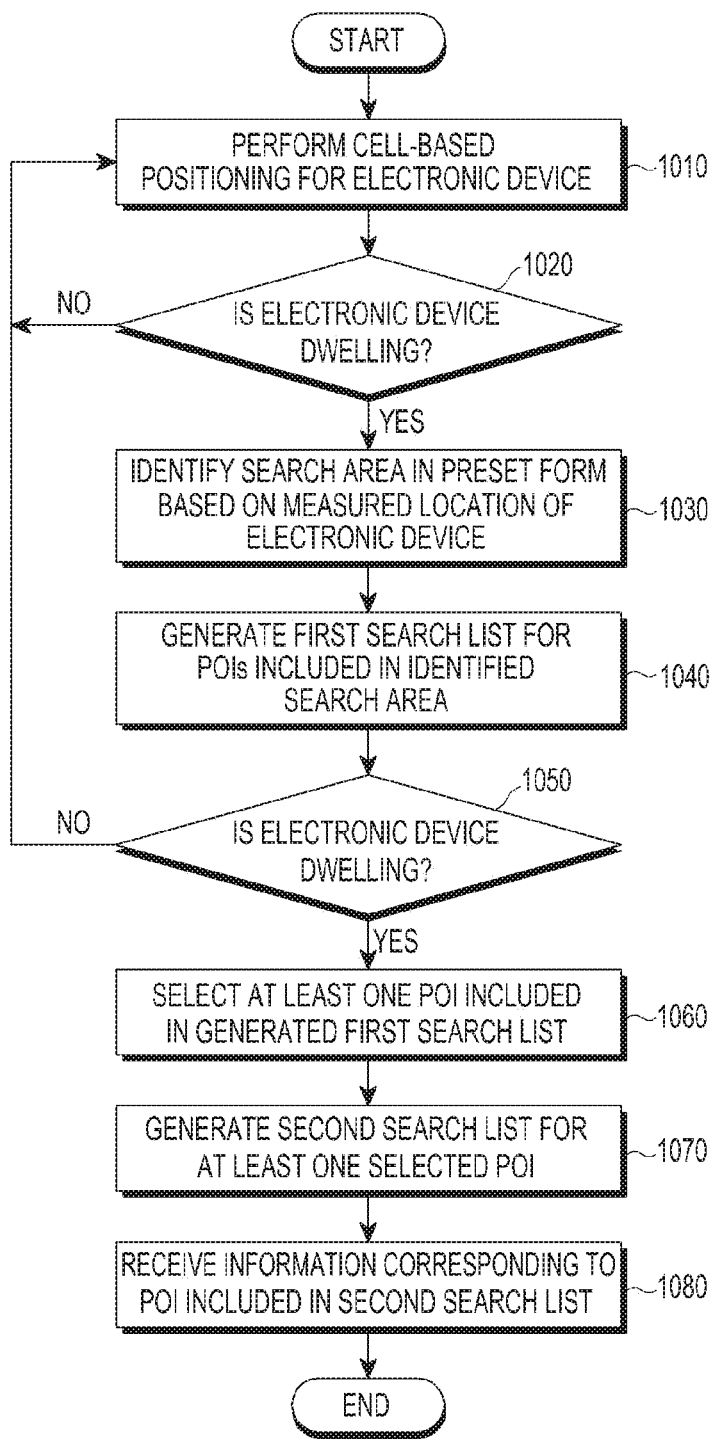
FIG. 10 is a flowchart illustrating a method of generating a search list related to a POI according to various embodiments of the present disclosure.

FIG. 10 is a flowchart illustrating a method of generating a search list related to a POI according to various embodiments of the present disclosure.

In step 1010, the processor may perform a cell-based positioning operation for the electronic device. The processor may use map information of a cellular base station received from the cellular base station in order to identify the current location of the electronic device or a designated location received from the user of the electronic device. Further, for accurate positioning of the electronic device, the processor may use information acquired from the WPS module 523 that performs positioning based on a GPS, a NLP, and a WLAN signal, and the radio footprint detector 524 that performs footprint-based detection based on cellular data and WLAN data.

In step 1020, the processor may determine whether the electronic device dwells within a threshold area from the previously identified location of the electronic device. The processor may store periodically acquired location information of the electronic device in a buffer and compare the current location of the electronic device with the previous location of the electronic device stored in the buffer. When a condition that the difference between the locations is less than or equal to a predetermined threshold value continues for a predetermined time, the processor may determine that the electronic device dwells within the threshold area. In contrast, when the condition that the difference between the locations is less than or equal to a predetermined threshold value does not continue for the predetermined time, the processor may determine that the electronic device exits from the threshold area.

The processor may acquire a path history for the user of the electronic device based on the periodically stored location information of the electronic device to determine where the electronic device dwells. The acquired path history of the user may be used to provide an additional service when an event such as call drop, positioning loss, or emergency situation (e.g., calling 911) is generated.

When the cell density within the reference tile and tiles adjacent to the reference tile is low, the positioning accuracy for the electronic device may deteriorate such that the processor may also store radio footprint information of a GPS, or a scanned WLAN base station. The stored radio footprint information may be used for correcting the path history of the user by increasing the positioning accuracy for the electronic device. The processor may grasp a dwelling history indicating a place where the user frequently visits based on the acquired path history of the user. The processor may receive a cell DB (e.g., map information of a cellular base station) for corresponding dwelling regions or a short-range network DB (e.g., map information of a WLAN base station) such as Wi-Fi from a server, provide an always-on positioning result of the electronic device based on the received DBs, and minimize power consumption. The processor may receive in advance information corresponding to a server associated with the dwelling history indicating the place where the user frequently visits and dwells based on the acquired path history of the user or information corresponding to a POI generated by a third party through a cellular network or a WLAN (e.g., Wi-Fi) and use the received information for performing low power geofencing.

When it is determined that the electronic device exits from the threshold area (that is, it is determined that the electronic device does not dwell in the threshold area), the processor may acquire the current location of the electronic device in step 1010. The processor may store periodically acquired location information of the electronic device in the buffer and compare the current location of the electronic device and the previous location of the electronic device stored in the buffer.

When it is determined that the electronic device dwells in the threshold area, the processor may identify a predetermined type of search area based on the measured dwelling location of the electronic device in step 1030. For example, the processor may partition a region corresponding to a current location of the electronic device or a designated location received from the user of the electronic device into a plurality of tiles. Alternatively, the processor may receive, from the outside, information on a plurality of tiles partitioned from the region corresponding to the current location of the electronic device or the designated location received from the user of the electronic device. The predetermined type of search area may consist of rectangles or other shapes of tiles.

Among the plurality of tiles partitioning the region corresponding to the current location of the electronic device or the designated location received from the user of the electronic device, the processor may configure a tile including the current location of the electronic device or the designated location received from the user of the electronic device as a reference tile. The reference tile may be defined as a minimum search area that can be used for searching for a POI.

In step 1040, the processor may receive information on POIs included in the identified search area from the outside. The processor may generate a first search list related to the POIs included in the identified search area based on the received information. The first search list may contain information on the POIs included in the identified search area. For example, the first search list may be configured using POIs included in tiles within the search area, and the POIs included in the first search list may be transmitted from an AP, or the server 106 to a CP in the unit of one or more tiles.

In step 1050, the processor may determine whether the electronic device dwells within a threshold area from the previously identified location of the electronic device. The processor may store periodically acquired location information from the electronic device in a buffer and compare the current location of the electronic device with the previous location of the electronic device stored in the buffer. When a condition that the difference between the locations is equal to or smaller than a predetermined threshold value continues for a predetermined time, the processor may determine that the electronic device dwells within the threshold area. In contrast, when the condition that the difference between the locations is less than or equal to a predetermined threshold value does not continue for the predetermined time, the processor may determine that the electronic device exits from the threshold area.

In step 1050, the processor may acquire a path history of the user of the electronic device based on the periodically stored location information of the electronic device to determine whether the electronic device dwells. The acquired path history of the user may be used to provide an additional service when an event such as call drop, positioning loss, or emergency situation (e.g., calling 911) is generated.

When the cell density within the reference tile and tiles adjacent to the reference tile is low, the positioning accuracy for the electronic device may deteriorate such that the processor may also store radio footprint information of a GPS or a scanned WLAN base station. The stored radio footprint information may be used for correcting the path history of the user by increasing the positioning accuracy for the electronic device. The processor may grasp a dwelling history indicating a place where the user frequently visits based on the acquired path history of the user. The processor may receive a cell DB (e.g., map information of a cellular base station) for corresponding dwelling regions or a short-range network DB (e.g., map information of a WLAN base station) such as Wi-Fi from a remote server, provide an always-on positioning result of the electronic device based on the received DBs, and minimize power consumption.

When it is determined that the electronic device does not dwell within the threshold area, the processor may newly identify the current location of the electronic device in step 1010. For the operation of identifying the current location of the electronic device, map information of a cellular base station received from the cellular base station may be used. Further, for accurate positioning of the electronic device, the processor may use information acquired from the WPS module 523 that performs positioning based on a GPS, a NLP, and a WLAN signal, and the radio footprint detector 524 that performs footprint-based detection based on cellular data and WLAN data. The processor may newly identify or update the reference tile based on the newly identified current location of the electronic device. When the update of the reference tile is completed, the processor may identify adjacent tiles based on the updated reference tile and identify a new search area based on the reference tile and the adjacent tiles.

Steps 1020 or 1050 may be omitted or performed independently according to a user's setting.

In step 1060, the processor may select at least one POI among the POIs included in the generated first search list, and acquire additional information related to at least one selected POI. For example, when it is determined that the electronic device dwells within the threshold area, the processor may measure a time for which the electronic device dwells in the threshold area. When the measured dwelling time is longer than or equal to a threshold time, the processor may update the generated search list based on the search area. For example, the POIs included in the already generated first search list may include information on all POIs included in the search area. The processor may select only a POI required by the electronic device among all the POIs included in the first search list. For such a selection process, an additional search condition including date or time information, altitude information, information on radio fingerprint such as cellular, Wi-Fi, and BT, activation information of an AP, or URL information from which additional information related to a POI can be acquired may be used as well as the current location 800 of the electronic device.

In step 1070, the processor may generate a second search list including POIs located with a predetermined distance from the current location of the electronic device among the POIs included in the first search list.

For example, the processor may configure a new restricted search list for the POIs included in the first search list based on the region determined as a region in which the electronic device dwells. The processor may acquire a second search list that excludes some of the POIs in the first search list based on the restricted search area.

The processor may perform geofencing after acquiring the second search list. For example, the processor may determine whether the electronic device enters a POI included in the second search list, exits from the POI, or dwells in the POI. Further, the processor may acquire additional information on the POI included in the second search list.

In step 1080, the processor may receive information corresponding to at least one POI included in the second search list. For example, the processor may receive an advertisement or a notification for at least one POI included in the second search list.

Figure 11:
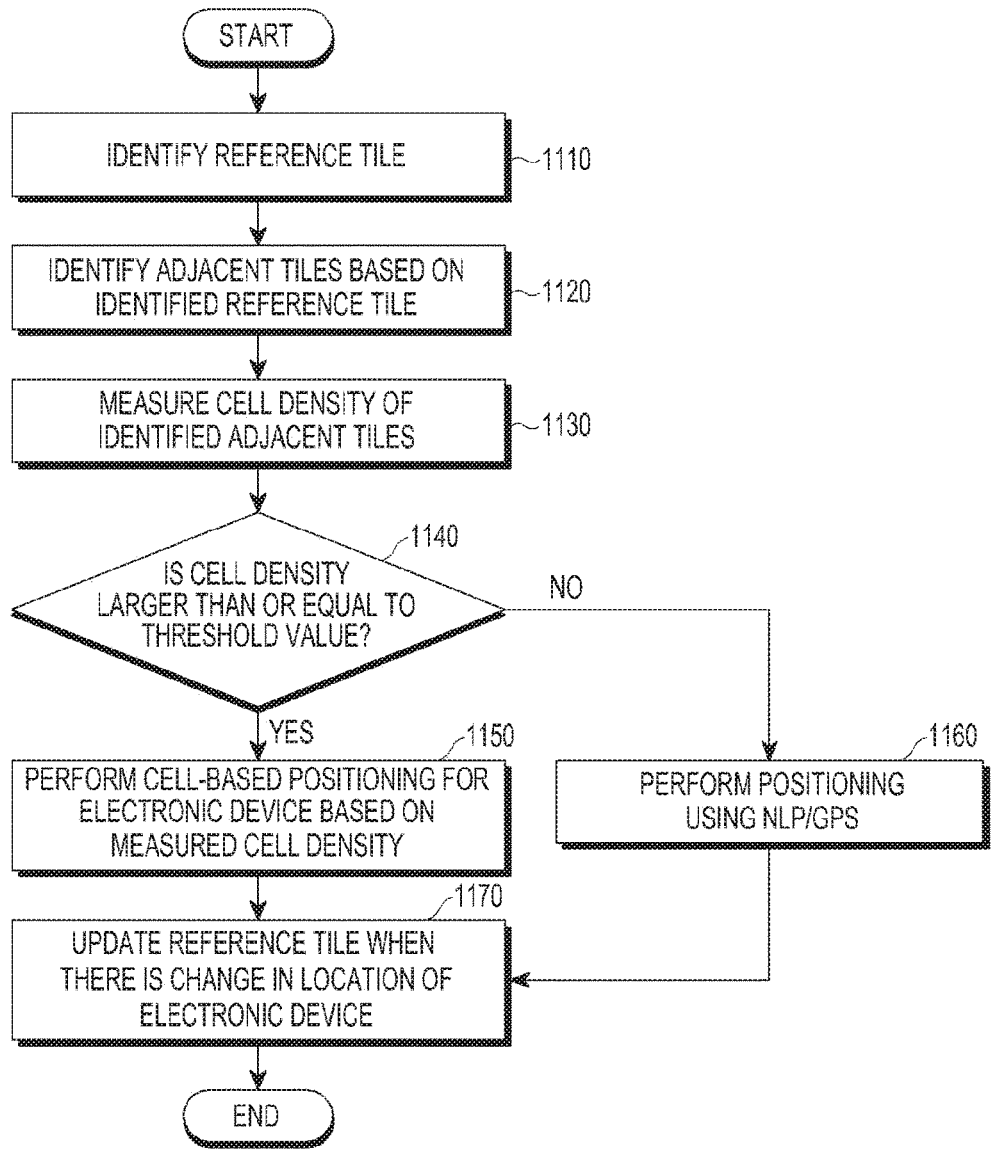
FIG. 11 is a flowchart illustrating a method of updating information on a reference tile where the electronic device is located based on cell density according to various embodiments of the present disclosure.

FIG. 11 is a flowchart illustrating a method of updating information on a reference tile where the electronic device is located based on cell density according to various embodiments of the present disclosure.

In step 1110, the processor may identify a reference tile including the current location of the electronic device. For example, the processor may predict the current location of the electronic device through a cellular communication network. A region corresponding to the predicted location may be partitioned into a plurality of tiles, and the processor may designate the tile including the predicted location among the plurality of tiles as a reference tile. The reference tile corresponds to the tile including the current location of the electronic device 101 may be changed according to movement of the electronic device.

In step 1120, the processor may identify at least one adjacent tile that neighbors the reference tile. The adjacent tile may refer to a tile that shares a boundary having a predetermined length or longer with the reference tile. Further, the adjacent tile may refer to a tile that does not share the boundary with the reference tile but is spaced apart from the reference tile by a predetermined length.

In step 1130, the processor may identify at least one cellular base station included in the reference tile or the adjacent tiles, and derive cell density of the reference tile or the adjacent tiles based on information on the identified cellular base station. For example, the processor may derive the cell density based on the number of cellular base stations existing per unit area. When the current location of the electronic device is identified using map information of the cellular base station received from the cellular base station, the current location of the electronic device may be more accurately measured as the cell density is higher.

In step 1140, the processor may determine whether the cell density of the reference tile or the adjacent tiles exceed a threshold value. For example, the processor may determine whether the cell density of the reference tile exceeds the threshold value. Since the cell density is proportional to the number of cells per tile, the cell density may be implemented to be the number of cells or a threshold value for the number of cells.

When the cell density of the reference tile is greater than or equal to the threshold value, the processor may identify the current location of the electronic device based on only the map information of the cellular base station received from the cellular base station included in the reference tile in step 1150.

In contrast, when the cell density of the reference tile is smaller than the threshold value, it may be difficult to identify the current location with accuracy for the electronic device based on only the map information from the cellular base station included in the reference tile. In this case, in step 1160, the processor may determine whether the cell density of the adjacent tiles exceed the threshold value. When the cell density of the adjacent tiles is greater than or equal to the threshold value, the processor may more accurately identify the current location of the electronic device by reflecting information (e.g., map information) received from the cellular base station included in the adjacent tiles in the current location from the electronic device identified using the map information of the cellular base station received from the cellular base station included in the reference tile. When the cell density of the adjacent tiles is less than the threshold value, the processor may use information acquired from the WPS module 523 that performs positioning based on a GPS, a NLP, and a WLAN signal, and the radio footprint detector 524 that performs footprint-based detection based on cellular data and WLAN data. According to an embodiment of the present disclosure, the cell-based positioning performance (e.g., step 1150) may be additionally performed before the positioning performance (e.g., step 1160) using the NLP and/or GPS, or may be performed simultaneously therewith.

Through step 1150 or 1160, the processor may identify the current location of the electronic device and determine movement of the electronic device by comparing the current location of the electronic device with the previously measured location of the electronic device.

In step 1170, when it is determined that there is a change in the location of the electronic device, the processor may newly configure the reference tile based on the newly identified current location of the electronic device.

Figure 12:
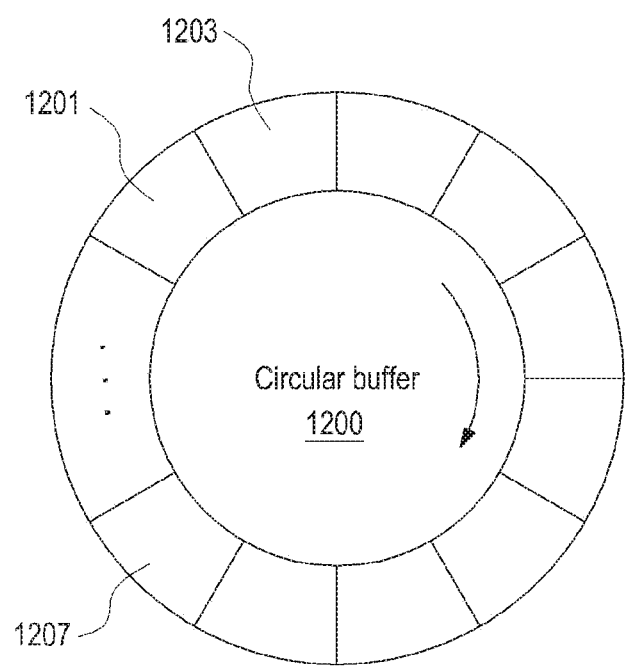
FIG. 12 illustrates a method of storing a path history of the user of the electronic device according to various embodiments of the present disclosure.

FIG. 12 illustrates a method of storing a path history of the user of the electronic device according to various embodiments of the present disclosure.

According to an embodiment of the present disclosure, the processor may periodically acquire the path history of the user having the electronic device and may store the acquired path history of the user in the memory of the electronic device. The processor may store the periodically acquired location information of the electronic device in a buffer 1200 of the electronic device and compare the current location of the electronic device with the previous location of the electronic device stored in the buffer.

For example, the location information of the electronic device acquired on a first period may be stored in a first section 1201 of the buffer. The location information of the electronic device acquired on a second period may be stored in a second section 1203.

Only when the electronic device moves by a predetermined separation distance or longer (e.g., 50 to 100 m), the processor may store the location information acquired on the corresponding period along with a timestamp value. For example, when a separation distance between the location information acquired on an $n^{th}$ period and location information acquired on an $n^{th}-1$ period is smaller than a preset threshold value, the location information acquired on the $n^{th}$ period may be skipped without being stored in the buffer 1200. In other words, when the electronic device does not move by the predetermined separation distance (e.g., 50 to 100 m), the processor may not buffer the positioning value on the corresponding period. In contrast, when the separation distance between the location information acquired on the $n^{th}$ period and location information acquired on the $n^{th}-1$ period is greater than or equal to the preset threshold value, the location information acquired on the $n^{th}$ period and the timestamp value corresponding to the $n^{th}$ period may be sequentially stored in the foremost section among empty spaces of the buffer 1200. The timestamp value corresponds to a value stored along with the location information to identify a time difference between positioning values stored in the buffer 1200 and may include a coordinated universal time (UTC) timestamp value.

Through such a method, the processor may periodically acquire the location information of the electronic device and store the location information in the buffer included in the electronic device. When the last section 1207 of the buffer is used, the processor may delete the earliest stored location information on the first period and store the newly acquired location information in the first section 1201 from which the location information on the first period has been deleted.

According to an embodiment of the present disclosure, when an event that requires the path history of the user stored in the buffer is generated, the second processor 520 (e.g., CP) may transmit all or some of the path history of the user stored in the buffer to the first processor 510 (e.g., application processor). For example, when an event such as call drop, positioning loss, and emergency situation (e.g., calling 911) is generated, the path history of the user stored in the buffer may be transmitted to the first processor 510 to provide an additional service.

A method of managing a POI based on a location of an electronic device according to various embodiments of the present disclosure may include an operation of receiving map information from a cellular base station including a plurality of tiles from at least one server, an operation of determining a location of the electronic device based on the received map information, an operation of identifying at least one tile corresponding to the location of the electronic device based on a request of a processor of the electronic device for configuring a POI, and an operation of obtaining a first search list for POIs included in the at least one identified tile.

The method of managing the POI based on the location of the electronic device according to various embodiments of the present disclosure may further include, when the determined location is changed, an operation of determining whether the changed location is within a threshold area based on the determined location, when the changed location is within the threshold area, an operation of measuring a dwelling time of the electronic device within the threshold area, and when the measured dwelling time is longer than or equal to a threshold time, an operation of obtaining a second search list including at least one POI among the POIs included in the first search list.

The method of managing the POI based on the location of the electronic device according to various embodiments of the present disclosure may further include an operation of obtaining the second search list including a POI existing within a preset area based on the determined location among the POIs included in the first search list.

The method of managing the POI based on the location of the electronic device according to various embodiments of the present disclosure may further include, when the determined location is changed, an operation of determining whether the changed location is within a threshold area based on the determined location, when the changed location is not within the threshold area, an operation of re-receiving map information of a cellular base station including a plurality of tiles from at least one server, an operation of determining the changed location of the electronic device based on the re-received map information, an operation of identifying at least one tile corresponding to the changed location of the electronic device based on a request of the processor for configuring a POI, and an operation of obtaining a changed search list for POIs included in the at least one identified tile corresponding to the changed location of the electronic device.

The method of managing the POI based on the location of the electronic device according to various embodiments of the present disclosure may further include an operation of identifying at least one tile adjacent to the at least one identified tile, and an operation of obtaining the first search list to which a POI included in the at least one tile adjacent to the at least one identified tile is added.

The method of managing the POI based on the location of the electronic device according to various embodiments of the present disclosure may further include an operation of identifying a region including the determined location among a plurality of regions of the at least one identified tile, the region is partitioned by at least one straight line passing through a central point of the at least one identified tile, and an operation of identifying at least one tile adjacent to the at least one identified tile based on the identified region.

The method of managing the POI based on the location of the electronic device according to various embodiments of the present disclosure may further include an operation of obtaining a cell density of the at least one identified tile based on a number of cellular base stations included in the at least one identified tile, when the obtained cell density is smaller than a threshold value, an operation of determining the location of the electronic device based on the determined location and at least one of information received from at least one WLAN base station and GPS information, and when the obtained cell density is greater than or equal to the threshold value, an operation of determining the location of the electronic device based on the determined location and information received from at least one cellular base station included in the at least one identified tile.

The method of managing the POI based on the location of the electronic device according to various embodiments of the present disclosure may further include an operation of identifying at least one tile adjacent to the at least one identified tile, an operation of obtaining a cell density of the at least one tile adjacent to the at least one identified tile based on a number of cellular base stations included in the at least one tile adjacent to the at least one identified tile, when the obtained cell density is smaller than a threshold value, an operation of determining the location of the electronic device based on the determined location and at least one of information received from at least one WLAN base station and GPS information, and when the obtained cell density is greater than or equal to the threshold value, an operation of determining the location of the electronic device based on the determined location and information received from at least one cellular base station included in the at least one tile adjacent to the at least one identified tile.

In the method of managing the POI based on the location of the electronic device according to various embodiments of the present disclosure, the plurality of tiles may correspond to a plurality of quadrangles arranged in a lattice form.

A computer-readable recording medium having a program recorded therein to execute the method described in the present disclosure may be included.

Each of the above-described component elements of hardware according to the present disclosure may be configured with one or more components, and the names of the corresponding component elements may vary based on the type of electronic device. In various embodiments of the present disclosure, the electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

The term "module" as used herein may include a unit consisting of hardware, software, or firmware, and may be used interchangeably with the term "logic", "logical block", "component", "circuit", or the like. The "module" may be an integrated component, or a minimum unit for performing one or more functions or a part thereof. The "module" may be mechanically or electronically implemented and may include an application specific integrated circuit (ASIC) chip, a field programmable gate arrays (FPGA), or a programmable-logic device, which has been known or are to be developed in the future, for performing certain operations.

At least some of devices (e.g., modules or functions thereof) or methods (e.g., operations) according to various embodiments of the present disclosure may be implemented by an instruction which is stored on a computer-readable storage medium (e.g., the memory 130) in the form of a program module. The instruction, when executed by a processor (e.g., the processor 120), may cause the one or more processors to execute the function corresponding to the instruction.

The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments of the present disclosure may be executed sequentially, in parallel, repeatedly, or in a heuristic manner. At least some operations may be executed according to another sequence, may be omitted, or may further include other operations.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device comprising:
a memory; and
a processor configured to:
receive map information of a cellular base station including a plurality of tiles from at least one server,
determine a location of the electronic device based on the received map information,
identify at least one tile corresponding to the location of the electronic device based on a request from the processor for configuring a Point of Interest (POI), and
obtain a first search list of POIs included in the at least one identified tile.

2. The electronic device of claim 1, wherein the processor is further configured to:
when the determined location is changed, determine whether the changed location is within a threshold area,
when the changed location is within the threshold area, measure a dwelling time of the electronic device within the threshold area, and
when the measured dwelling time is greater than or equal to a threshold time, obtain a second search list including at least one POI among the POIs included in the first search list.

3. The electronic device of claim 2, wherein the processor is further configured to:
obtain the second search list including a POI existing within a preset area based on the determined location among the POIs included in the first search list.

4. The electronic device of claim 1, wherein the processor is further configured to:
when the determined location is changed, determine whether the changed location is within a threshold area,
when the changed location is not within the threshold area, re-receive map information of a cellular base station including a plurality of tiles from at least one server,
determine the changed location of the electronic device based on the re-received map information,
identify at least one tile corresponding to the changed location of the electronic device based on a request from the processor for configuring a POI, and
obtain a changed search list for POIs included in the at least one identified tile corresponding to the changed location of the electronic device.

5. The electronic device of claim 1, wherein the processor is further configured to:
identify at least one tile adjacent to the at least one identified tile, and
obtain the first search list to which a POI included in the at least one tile adjacent to the at least one identified tile is added.

6. The electronic device of claim 1, wherein the processor is further configured to:
identify a region including the determined location among a plurality of regions of the at least one identified tile, wherein the region is partitioned by at least one straight line passing through a central point of the at least one identified tile, and
identify at least one tile adjacent to the at least one identified tile based on the identified region.

7. The electronic device of claim 1, wherein the processor is further configured to:
obtain a cell density of the at least one identified tile based on a number of cellular base stations included in the at least one identified tile,
when the obtained cell density is less than a threshold value, determine the location of the electronic device based on at least one of information received from at least one wireless local area network (WLAN) base station and global positioning system (GPS) information, and
when the obtained cell density is greater than or equal to the threshold value, determine the location of the electronic device based on information received from at least one cellular base station included in the at least one identified tile.

8. The electronic device of claim 1, wherein the processor is further configured to:
identify at least one tile adjacent to the at least one identified tile,
obtain a cell density of the at least one tile adjacent to the at least one identified tile based on a number of cellular base stations included in the at least one tile adjacent to the at least one identified tile,
when the obtained cell density is less than a threshold value, determine the location of the electronic device based on at least one of information received from at least one wireless local area network (WLAN) base station and global positioning system (GPS) information, and
when the obtained cell density is greater than or equal to the threshold value, determine the location of the electronic device based on information received from at least one cellular base station included in the at least one tile adjacent to the at least one identified tile.

9. The electronic device of claim 1, wherein the plurality of tiles correspond to a plurality of quadrangles arranged in a lattice form.

10. A method of managing a Point of Interest (POI) based on a location of an electronic device, the method comprising:
receiving map information of a cellular base station including a plurality of tiles from at least one server;
determining a location of the electronic device based on the received map information;
identifying at least one tile corresponding to the location of the electronic device based on a request from a processor of the electronic device for configuring a POI; and
obtaining a first search list of POIs included in the at least one identified tile.

11. The method of claim 10, further comprising:
when the determined location is changed, determining whether the changed location is within a threshold area;
when the changed location is within the threshold area, measuring a dwelling time of the electronic device within the threshold area; and
when the measured dwelling time is greater than or equal to a threshold time, obtaining a second search list including at least one POI among the POIs included in the first search list.

12. The method of claim 11, further comprising obtaining the second search list including a POI existing within a preset area based on the determined location among the POIs included in the first search list.

13. The method of claim 10, further comprising:

when the determined location is changed, determining whether the changed location is within a threshold area;

when the changed location is not within the threshold area, re-receiving map information of a cellular base station including a plurality of tiles from at least one server;

determining the changed location of the electronic device based on the re-received map information;

identifying at least one tile corresponding to the changed location of the electronic device based on a request from the processor for configuring a POI; and obtaining a changed search list for POIs included in the at least one identified tile corresponding to the changed location of the electronic device.

14. The method of claim 10, further comprising:

identifying at least one tile adjacent to the at least one identified tile; and obtaining the first search list to which a POI included in the at least one tile adjacent to the at least one identified tile is added.

15. The method of claim 10, further comprising:

identifying a region including the determined location among a plurality of regions of the at least one identified tile, wherein the region is partitioned by at least one straight line passing through a central point of the at least one identified tile; and identifying at least one tile adjacent to the at least one identified tile based on the identified region.

16. The method of claim 10, further comprising:

obtaining a cell density of the at least one identified tile based on a number of cellular base stations included in the at least one identified tile;

when the obtained cell density is less than a threshold value, determining the location of the electronic device based on at least one of information received from at least one wireless local area network (WLAN) base station and global positioning system (GPS) information; and when the obtained cell density is greater than or equal to the threshold value, determining the location of the electronic device based on information received from at least one cellular base station included in the at least one identified tile.

17. The method of claim 10, further comprising:

identifying at least one tile adjacent to the at least one identified tile;

obtaining a cell density of the at least one tile adjacent to the at least one identified tile based on a number of cellular base stations included in the at least one tile adjacent to the at least one identified tile;

when the obtained cell density is less than a threshold value, determining the location of the electronic device based on at least one of information received from at least one wireless local area network (WLAN) base station and global positioning system (GPS) information; and when the obtained cell density is greater than or equal to the threshold value, determining the location of the electronic device based on information received from at least one cellular base station included in the at least one tile adjacent to the at least one identified tile.

18. The method of claim 10, wherein the plurality of tiles correspond to a plurality of quadrangles arranged in a lattice form.

19. A non-transitory computer-readable recording medium having a program recorded thereon to execute the method claim 10.

* * * * *